(12) United States Patent
Urakabe et al.

(10) Patent No.: US 8,541,989 B2
(45) Date of Patent: Sep. 24, 2013

(54) POWER SUPPLY APPARATUS

(75) Inventors: Takahiro Urakabe, Tokyo (JP); Tatsuya Okuda, Tokyo (JP); Akihiko Iwata, Tokyo (JP); Hirotoshi Maekawa, Tokyo (JP); Masaru Kobayashi, Tokyo (JP); Matahiko Ikeda, Tokyo (JP); Yoshikazu Tsunoda, Tokyo (JP); Kazutoshi Kaneyuki, Tokyo (JP); Yuya Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 378 days.

(21) Appl. No.: 13/003,841

(22) PCT Filed: Jul. 15, 2009

(86) PCT No.: PCT/JP2009/003317
§ 371 (c)(1),
(2), (4) Date: Apr. 11, 2011

(87) PCT Pub. No.: WO2010/007771
PCT Pub. Date: Jan. 21, 2010

(65) Prior Publication Data
US 2011/0181250 A1    Jul. 28, 2011

(30) Foreign Application Priority Data

Jul. 17, 2008   (JP) ................................. 2008-185450

(51) Int. Cl.
| | |
|---|---|
| *H02P 11/00* | (2006.01) |
| *H02P 9/00* | (2006.01) |
| *H02H 7/06* | (2006.01) |
| *H02P 9/14* | (2006.01) |
| *H02M 5/45* | (2006.01) |

(52) U.S. Cl.
USPC ................... 322/23; 322/19; 322/44; 322/46; 363/37

(58) Field of Classification Search
USPC ............................ 322/19, 23, 44, 46; 363/37
See application file for complete search history.

(56) References Cited

U.S. PATENT DOCUMENTS

| 5,719,484 A | 2/1998 | Taniguchi et al. ............... 322/20 |
| 6,175,217 B1 * | 1/2001 | Da Ponte et al. ............... 322/19 |

(Continued)

FOREIGN PATENT DOCUMENTS

| JP | 4 87530 | 3/1992 |
| JP | 5 292676 | 11/1993 |

(Continued)

OTHER PUBLICATIONS

Japanese Office Action issued Jul. 3, 2012, in patent Application No. 2010-520770 with partial English Translation.

(Continued)

*Primary Examiner* — Pedro J Cuevas
(74) *Attorney, Agent, or Firm* — Oblon, Spivak, McClelland, Maier & Neustadt, L.L.P.

(57) ABSTRACT

A power supply apparatus includes: an AC generator including an AC generating section, and a rectifier for rectifying an AC voltage generated in the AC generating section, and outputting a DC voltage; and a DC/DC converter for converting the output voltage of the rectifier into a DC voltage having a different voltage value, wherein the output voltage of the rectifier is set to be larger than the output voltage of the DC/DC converter in accordance with the rotation speed of the AC generating section and the amount of power supply to an electrical load connected to the DC/DC converter, and is stepped down and outputted by using the DC/DC converter. The power supply apparatus is capable of increasing an output power efficiently.

17 Claims, 13 Drawing Sheets

(56) References Cited

U.S. PATENT DOCUMENTS

| | | | |
|---|---|---|---|
| 6,349,044 B1 | 2/2002 | Canales-Abarca et al. | 363/17 |
| 6,845,020 B2 * | 1/2005 | Deng et al. | 363/37 |
| 6,909,262 B2 * | 6/2005 | Yao et al. | 322/28 |
| 7,612,542 B2 * | 11/2009 | Eguchi et al. | 323/222 |
| 7,830,680 B2 * | 11/2010 | Eguchi et al. | 363/37 |
| 7,875,989 B2 * | 1/2011 | Morris et al. | 290/40 B |
| 8,030,905 B2 * | 10/2011 | Petkov | 322/46 |
| 2003/0090235 A1 | 5/2003 | Tsuji | 320/128 |
| 2004/0027839 A1 * | 2/2004 | Deng et al. | 363/37 |
| 2008/0068870 A1 * | 3/2008 | Eguchi et al. | 363/37 |
| 2008/0259666 A1 * | 10/2008 | Eguchi et al. | 363/131 |
| 2010/0007312 A1 * | 1/2010 | Petkov | 322/44 |
| 2012/0099352 A1 * | 4/2012 | Motegi | 363/65 |
| 2013/0119970 A1 * | 5/2013 | Trainer et al. | 323/364 |

FOREIGN PATENT DOCUMENTS

| | | |
|---|---|---|
| JP | 8-298732 A | 11/1996 |
| JP | 2001-298873 | 10/2001 |
| JP | 2003 153597 | 5/2003 |
| JP | 2008 72856 | 3/2008 |

OTHER PUBLICATIONS

International Search Report issued Oct. 20, 2009 in PCT/JP09/03317 filed Jul. 15, 2009.

Japanese Office Action issued Dec. 4, 2012 in Patent Application No. 2010-520770 with Partial English Translation.

* cited by examiner

POWER SUPPLY APPARATUS

TECHNICAL FIELD

The present invention relates to a power supply apparatus capable of enhancing an ability to supply power to an electrical load.

BACKGROUND ART

One example of conventional power supply apparatuses has three-phase armature windings provided to an armature core of a stator, and a field winding provided to a magnetic pole core of a rotor, and includes: a three-phase AC generator that is driven by rotation of an engine of a vehicle or the like and thereby generates electricity; a rectifier that converts three-phase AC voltages generated by the three-phase AC generator into DC voltages through rectification; and a field adjusting circuit that detects output voltages of the rectifier and adjusts an exciting current flowing in the field winding such that the output voltages will be a predetermined value (see, for example, Patent Literature 1).

CITATION LIST

Patent Literature

Patent Literature 1: Japanese Laid-Open Patent Publication No. H05-292676

DISCLOSURE OF THE INVENTION

Problems to be Solved by the Invention

Here, for example, power supply apparatuses for vehicles supply power not only to various electrical loads (hereinafter, referred to as internal loads) such as lighting electrical apparatuses, air-conditioning compressors, heaters, and batteries provided to the vehicles, but sometimes also to external electrical loads (hereinafter, referred to as external loads) such as simple refrigerators, cleaners, and external lights, which are connected to the power supply apparatuses by using plugs. In the case where power supply apparatuses supply power to external loads connected thereto, the power supply apparatuses need to enhance abilities of power supply in comparison with the case where the power supply apparatuses supply power only to internal loads.

The conventional power supply apparatus disclosed in Patent Literature 1 increases the amount of electrical generation when the rotation speed of the rotor of the AC generator is increased. However, since the amount of heat generation in the AC generator depends on the amounts of currents flowing in the stator windings, the conventional power supply apparatus operates so as to suppress the amounts of the currents when the rotation speed is increased, in view of safety and reliability. Moreover, the conventional power supply apparatus has a problem that it is difficult to increase its output power because its output is connected to a battery for charge in which a predetermined voltage (for example, 14 V) is set.

The present invention has been made to solve the above problems, and an object of the present invention is to provide a power supply apparatus capable of further enhancing an ability to supply power to an electrical load, in comparison with the conventional power supply apparatuses.

Solution to the Problems

A power supply apparatus of the present invention comprises: an AC generator including an AC generating section, and a rectifier for rectifying an AC voltage generated in the AC generating section into a DC voltage, and outputting the DC voltage; and a DC/DC converter for converting the DC voltage outputted by the rectifier into a DC voltage having a voltage value different from that of the DC voltage outputted by the rectifier, wherein, the power supply apparatus sets the DC voltage outputted by the rectifier to be larger than the DC voltage outputted by the DC/DC converter in accordance with the rotation speed of the AC generating section and the amount of power supply to an electrical load connected to the DC/DC converter, steps down the DC voltage outputted by the rectifier by using the DC/DC converter, and outputs the DC voltage that has been stepped down.

Effect of the Invention

In the power supply apparatus of the present invention, the DC/DC converter is provided on the output side of the rectifier for rectifying an AC voltage generated in the AC generating section into a DC voltage, and outputting the DC voltage. When the rotation speed of the AC generating section is equal to or smaller than a predetermined value, the DC/DC converter directly outputs the output voltage of the rectifier through the DC/DC converter in a bypassed manner.

In addition, when the rotation speed of the AC generating section is equal to or larger than the predetermined value, if the amount of power required by the electrical load is large, the output voltage of the rectifier is set to be larger than the output voltage of the DC/DC converter, and is stepped down and outputted by using the DC/DC converter. On the other hand, if the required amount of power is small, the output voltage of the rectifier is directly outputted through the DC/DC converter in a bypassed manner.

Thus, in accordance with the amount of power required by the electrical load, the power supply apparatus of the present invention directly outputs the output voltage of the rectifier, or converts the output voltage into a stepped down voltage and outputs the stepped down voltage. Therefore, when the rotation speed is equal to or smaller than a certain value, the output power equal to that in the conventional cases can be obtained, and when the rotation speed is equal to or larger than a certain value, the output power larger than that in the conventional cases can be obtained.

BEST MODE FOR CARRYING OUT THE INVENTION

Embodiment 1

Figure 1:
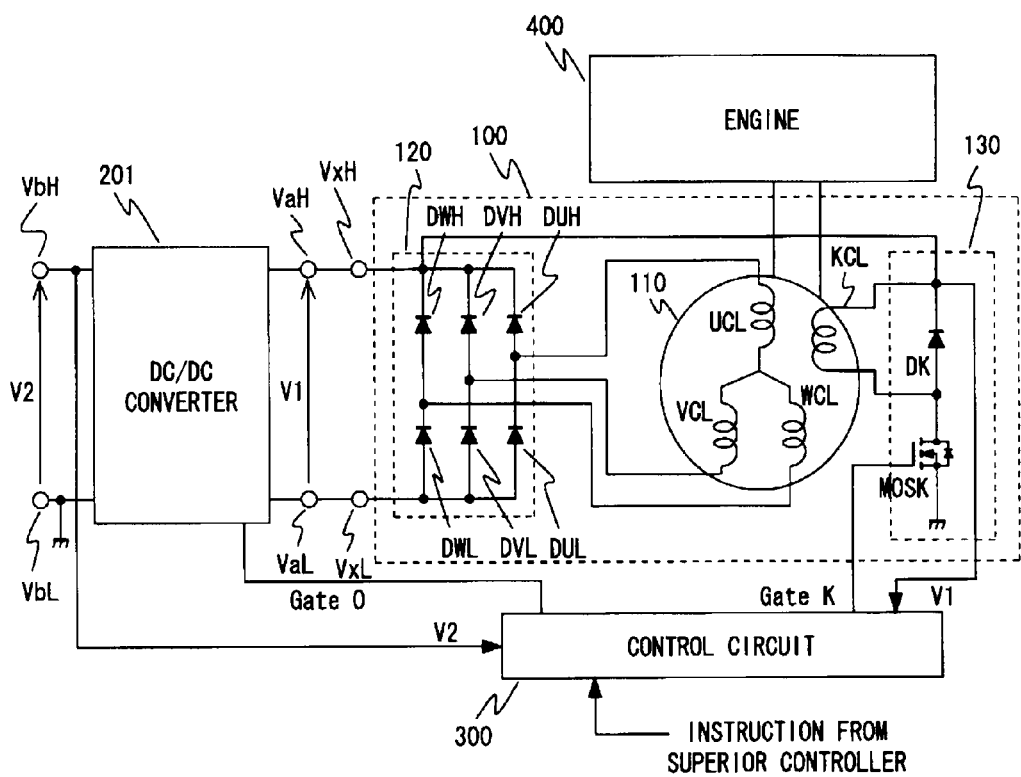
FIG. 1 is a configuration diagram showing the entirety of a power supply apparatus of embodiment 1 of the present invention.
Figure 2:
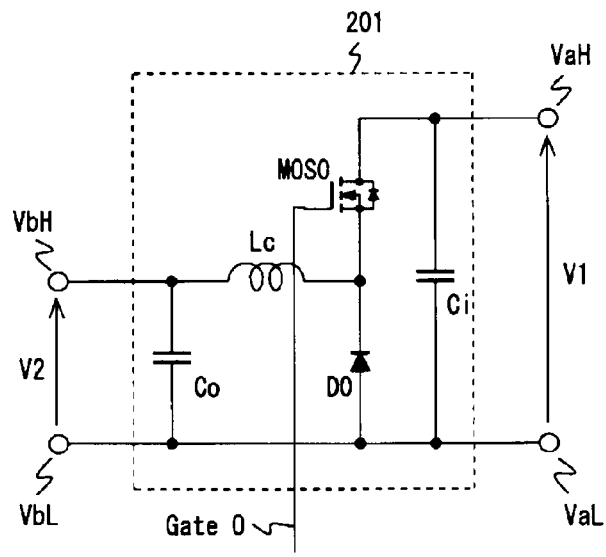
FIG. 2 is a circuit diagram showing a configuration of a DC/DC converter of the power supply apparatus of embodiment 1.

FIG. 1 is a configuration diagram showing the entirety of a power supply apparatus of embodiment 1 of the present invention, and FIG. 2 is a circuit diagram showing a configuration of a DC/DC converter of the power supply apparatus.

In embodiment 1, the power supply apparatus for a vehicle will be described as an example. The power supply apparatus of embodiment 1 includes an AC generator 100 such as an alternator, a DC/DC converter 201, and a control circuit 300 for controlling the AC generator 100 and the DC/DC converter 201. A rotor of the AC generator 100 is mechanically connected via a belt or a gear to a rotation unit (not shown) of an engine 400 of the vehicle. Output voltage terminals VxH and VxL of the AC generator 100 are connected to input voltage terminals VaH and VaL of the DC/DC converter 201. A battery and various electrical loads, not shown, are connected to output voltage terminals VbH and VbL of the DC/DC converter 201.

A voltage V1 of the output voltage terminal VxH of the AC generator 100, and a voltage V2 of the output voltage terminal VbH of the DC/DC converter 201 are inputted to the control circuit 300. Meanwhile, the control circuit 300 outputs a gate driving signal Gate-K to the AC generator 100, and outputs a gate driving signal Gate-0 to the DC/DC converter 201.

Next, a configuration of the AC generator 100 will be described.

The AC generator 100 includes a three-phase AC generating section 110, a rectifier 120, and a field adjusting circuit 130. The three-phase AC generating section 110 includes the rotor having a field winding KCL, and a stator having U-phase, V-phase, and W-phase stator windings UCL, VCL, and WCL which are present around an outer circumferential portion of the rotor.

The rectifier 120 is a diode bridge circuit for performing full-wave rectification, and includes diodes DUH, DUL, DVH, DVL, DWH, and DWL. In this case, the cathode terminals of the diodes DUH, DVH, and DWH are connected to the output voltage terminal VxH, and the anode terminals of the diodes DUL, DVL, and DWL are connected to the output voltage terminal VxL. The anode of the diode DUH and the cathode of the diode DUL are connected to each other, and the connection point therebetween is connected to one end of the U-phase winding UCL of the stator. The anode of the diode DVH and the cathode of the diode DVL are connected to each other, and the connection point therebetween is connected to one end of the V-phase winding VCL of the stator. The anode of the diode DWH and the cathode of the diode DWL are connected to each other, and the connection point therebetween is connected to one end of the W-phase winding WCL of the stator.

The field adjusting circuit 130 includes a MOSFET (MOS-K) and a diode DK. One end of the field winding KCL is connected to the cathode terminal of the diode DK, and also connected to the output voltage terminal VxH. The other end of the field winding KCL is connected to the connection point between the anode terminal of the diode DK and the drain terminal of the MOSFET (MOS-K). The source terminal of the MOSFET (MOS-K) is grounded, and the gate terminal is connected to the control circuit 300.

Next, operation of the AC generator 100 will be described.

The control circuit 300 adjusts a duty ratio of the gate driving signal Gate-K such that the detected voltage V1 is an intended voltage corresponding to the amount of power supply to an electrical load, and drives the MOSFET (MOS-K) by using the adjusted gate driving signal Gate-K. That is, if the detected voltage V1 is smaller than the intended voltage, the gate driving signal Gate-K is adjusted by the control circuit 300 such that the duty ratio is increased, and if the detected voltage V1 is larger than the intended voltage, the gate driving signal Gate-K is adjusted by the control circuit 300 such that the duty ratio is decreased.

When the operation of switching the MOSFET (MOS-K) is controlled as described above, the amount of a current flowing in the field winding KCL is controlled, and the amount of a magnetic flux generated by the rotor which has the field winding KCL is controlled. AC voltages (AC powers) induced in the U-phase, V-phase, and W-phase stator windings UCL, VCL, and WCL vary in accordance with the amount of the magnetic flux generated by the rotor. Moreover, the induced U-phase, V-phase, and W-phase AC voltages are converted into DC voltages (DC powers) by the rectifier 120, and the DC voltages are outputted as the voltage V1 through the output voltage terminals VxH and VxL of the AC generator 100. Thus, since the control circuit 300 controls a field current flowing in the field winding KCL such that the voltage V1 is an intended voltage, the AC generator 100 generates the predetermined voltage V1 such that a generated power is constantly controlled.

Next, a configuration of the DC/DC converter 201 will be described.

The DC/DC converter 201 is the same as a general step-down non-isolated DC/DC power conversion circuit, as shown in FIG. 2 (see, for example, "Power Electronics Circuit", Ohmsha, Ltd. pp. 245-265, 2000, edited by Semiconductor Power Conversion System Investigation Expert Committee in the Institute of Electrical Engineers of Japan).

The DC/DC converter 201 includes a MOSFET (MOS-0) as a switching device, a diode D0, an inductor Lc, and two smoothing capacitors Ci and Co. The storage amount and the discharge amount of a magnetic energy of the inductor Lc are controlled based on ON/OFF control of the MOSFET (MOS-0) in accordance with intervals of switching of the ON/OFF control. The drain terminal of the MOSFET (MOS-0) is connected to the input voltage terminal VaH and a first terminal of the smoothing capacitor Ci. The source terminal of the MOSFET (MOS-0) is connected to the cathode terminal of the diode D0 and a first terminal of the inductor Lc. The anode terminal of the diode D0 is connected to the input voltage terminal VaL, the output voltage terminal VbL, a second terminal of the smoothing capacitor Ci, and a second terminal of the smoothing capacitor Co. A second terminal of the inductor Lc is connected to the output voltage terminal VbH and a first terminal of the smoothing capacitor Co. The gate driving signal Gate-0 is inputted to the gate terminal of the MOSFET (MOS-0) from the control circuit 300.

Next, operation of the DC/DC converter 201 will be described.

The control circuit 300 detects the voltage V2 of the output voltage terminal VbH. Then, the control circuit 300 compares the detected voltage V2 with an intended voltage (in this case, 14 V), and thereby determines a duty ratio of the gate driving signal Gate-0 to be inputted to the gate terminal of the MOSFET (MOS-0). If the detected voltage V2 is smaller than the intended voltage, the control circuit 300 adjusts the gate driving signal Gate-0 such that the duty ratio increases, and if the detected voltage V2 is larger than the intended voltage, the control circuit 300 adjusts the gate driving signal Gate-0 such that the duty ratio decreases.

Thus, the control circuit 300 changes the duty ratio of the gate driving signal Gate-0 for the MOSFET (MOS-0) as described above, and thereby the DC/DC converter 201 performs a step-down adjustment for the voltage V1 inputted through the input voltage terminals VaH and VaL, and outputs the resultant voltage as the voltage V2 through the output voltage terminals VbH and VbL. At this time, the voltage V2 is adjusted to 14 V. The above principle of operation of the DC/DC converter 201 is as described in the above literature.

Next, the whole operation of the power supply apparatus including the AC generator 100, the DC/DC converter 201, and the control circuit 300 will be described.

First, an output characteristic of the AC generator 100 will be described.

When a current in the field winding KCL is constant, the output power of the AC generator 100 increases with an increase in the rotation speed of the three-phase AC generating section 110. However, owing to the increase in the output power, currents in the stator windings UCL, VCL, and WCL increase, and as a result, the generator 100 generates heat. The amount of the heat generation by the generator 100 needs to be kept equal to or smaller than a certain value, in view of reliability and safety of the apparatus. Therefore, a current in the field winding KCL is adjusted by the field adjusting circuit 130, and thereby the output power (output current) of the AC generator 100 is adjusted. In addition, since the amount of heat generation depends on a current, a large power is obtained by increasing the output voltage without changing the output current.

Figure 3:
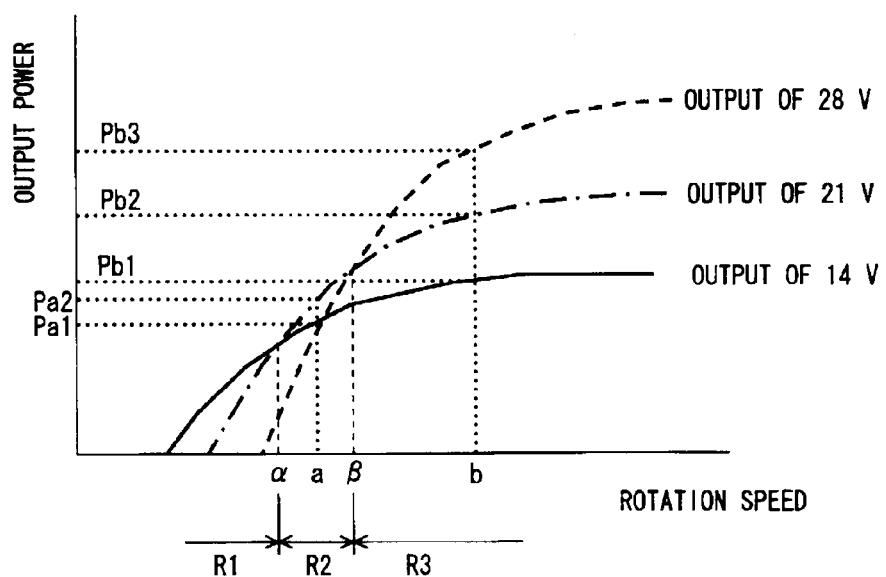
FIG. 3 is a characteristic diagram showing a relationship of the rotation speed and the output power of an AC generator of the power supply apparatus of embodiment 1, to the output voltage of the AC generator.

FIG. 3 shows a relationship between the rotation speed and the output power in the cases where the output voltage of the AC generator 100 is 14 V, 21 V, and 28 V as an example. As shown in FIG. 3, α represents the rotation speed at the intersection of an output characteristic line (solid line) for 14 V and an output characteristic line (dashed-dotted line) for 21 V, and β represents the rotation speed at the intersection of the output characteristic line (dashed-dotted line) for 21 V and an output characteristic line (dashed line) for 28 V. As is found from FIG. 3, in a region R1 in which the rotation speed of the AC generator is equal to or smaller than α, a large power can be outputted by setting the output voltage at 14 V. In a region R2 in which the rotation speed is larger than α and smaller than β, a large power can be outputted by setting the output voltage at 21 V. In a region R3 in which the rotation speed is equal to or larger than β, a large power can be outputted by setting the output voltage at 28 V.

Here, when the rotation speed of the AC generator 100 is a (α<a<β) in FIG. 3, a superior controller, not shown, determines a required amount of power supply (amount of electrical generation), and outputs an instruction of a voltage setting value corresponding to the required amount of power supply, to the control circuit 300. In the case where the voltage instruction indicates 14 V, that is, in the case where the amount of electrical generation does not need to be increased, as described above, the control circuit 300 causes the field adjusting circuit 130 to adjust a current in the field winding KCL to set the output voltage of the AC generator 100 at 14 V, causes the MOSFET (MOS-0) in the DC/DC converter 201 to be constantly ON, and shorts the output of the AC generator 100 and the output of the DC/DC converter 201. In this operation state, since the MOSFET in the DC/DC converter 201 does not perform a switching operation, the energy can be transferred with a low power loss.

On the other hand, in the case where the rotation speed of the AC generator 100 is a (α<a<β) in FIG. 3 and a voltage instruction given by the superior controller, not shown, indicates 21 V, that is, in the case where the amount of electrical generation needs to be increased, the control circuit 300 sets the output voltage of the AC generator 100 at 21 V, causes the MOSFET (MOS-0) in the DC/DC converter 201 to perform an ON/OFF operation as described above, and performs a step-down power conversion from 21 V to 14 V. At this time, the output power can be further increased in comparison with the conventional power supply apparatus having only the AC generator 100. In addition, since the DC/DC converter 201 performs a switching operation, a switching loss of the MOSFET (MOS-0) and a loss due to an AC current in the inductor Lc occur. Therefore, the power loss slightly increases in comparison with that upon the above operation based on a voltage instruction indicating 14 V.

In addition, when the rotation speed of the AC generator 100 is b (γ<β) in FIG. 3, the superior controller, not shown, determines a required amount of power supply, and outputs an instruction of a voltage setting value corresponding to the required amount of power supply, to the control circuit 300. In the case where the voltage instruction indicates 14 V, that is, in the case where the amount of electrical generation does not need to be increased, the control circuit 300 sets the output voltage of the AC generator 100 at 14 V, causes the MOSFET (MOS-0) in the DC/DC converter 201 to be constantly ON, and shorts the output of the AC generator 100 and the output of the DC/DC converter 201. In this operation state, since the MOSFET (MOS-0) in the DC/DC converter does not perform a switching operation, the energy can be transferred with a low power loss.

On the other hand, in the case where the rotation speed of the AC generator 100 is b (γ<β) in FIG. 3 and a voltage instruction given by the superior controller, not shown, indicates 21 V, that is, in the case where the amount of electrical generation needs to be increased, the control circuit 300 sets the output voltage of the AC generator 100 at 21 V, causes the MOSFET (MOS-0) in the DC/DC converter 201 to perform an ON/OFF operation, and thereby performs a step-down power conversion from 21 V to 14 V. In addition, in the case where a voltage instruction given by the superior controller indicates 28 V, that is, in the case where the amount of electrical generation needs to be further increased, the control circuit 300 sets the output voltage of the AC generator 100 at 28 V, causes the MOSFET (MOS-0) in the DC/DC converter 201 to perform an ON/OFF operation, and thereby performs a step-down power conversion from 28 V to 14 V. It is noted that in the case where a step down from 28 V to 14 V is performed, the duty ratio of the gate driving signal Gate-0 is set to be a smaller value than that in the case where a step down from 21 V to 14 V is performed.

Thus, the power supply apparatus of embodiment 1 can further increase the output power in comparison with the conventional power supply apparatus having only the AC generator 100. It is noted that since the DC/DC converter 201 performs a switching operation, a switching loss of the MOSFET (MOS-0) and a loss due to an AC current in the inductor Lc occur. Therefore, the power loss slightly increases in comparison with that upon the above operation based on a voltage instruction indicating 14 V.

For example, in automobiles, the rotation speed of the engine is usually 1000 rpm to 3000 rpm in normal use. By adjusting the ratio of gears connecting the rotor of the AC generator 100 and the rotation section of the engine so as to obtain the characteristic shown in FIG. 3, a desired output power can be obtained.

Embodiment 2

Figure 4:
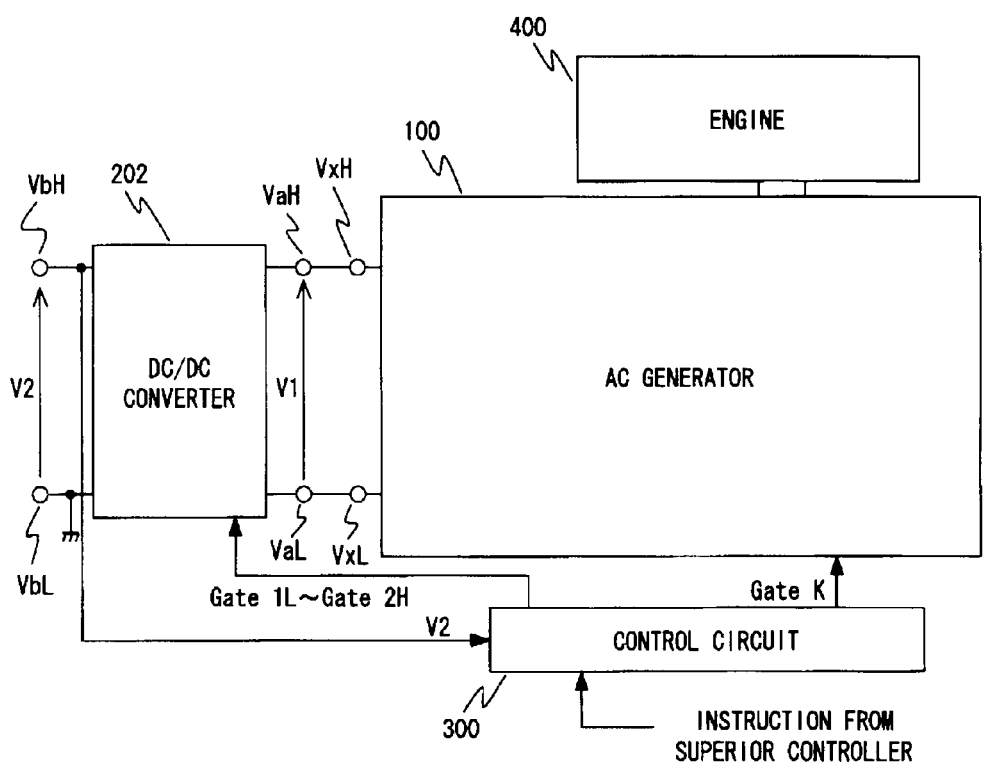
FIG. 4 is a configuration diagram showing the entirety of a power supply apparatus of embodiment 2 of the present invention.
Figure 5:
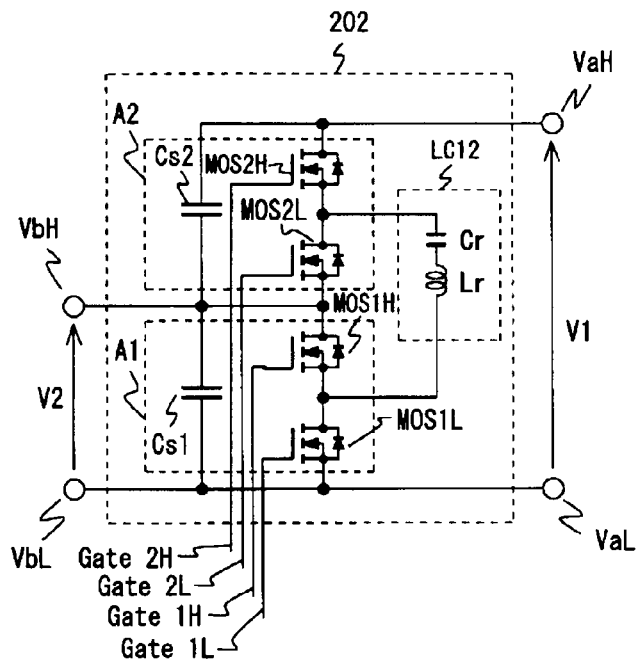
FIG. 5 is a circuit diagram showing a configuration of a DC/DC converter of the power supply apparatus of embodiment 2.

FIG. 4 is a configuration diagram showing the entirety of a power supply apparatus of embodiment 2, and FIG. 5 is a circuit diagram showing a configuration of a DC/DC converter of the power supply apparatus. Components that correspond to or are the same as components shown in FIG. 1 and FIG. 2 are denoted by the same reference numerals.

In embodiment 2, a manner of connection among the AC generator 100, a DC/DC converter 202, and the engine 400 is the same as in embodiment 1, but a circuit configuration of the DC/DC converter 202, and a manner of connection to the control circuit 300 are different from that in embodiment 1.

The control circuit 300 outputs the gate driving signal Gate-K to the field adjusting circuit 130 of the AC generator 100, and outputs four gate driving signals Gate-1L to Gate-2H to the DC/DC converter 202. The voltage V2 of the output voltage terminal VbH of the DC/DC converter 202 is inputted to the control circuit 300. However, unlike embodiment 1, the voltage V1 of the output voltage terminal VxH of the AC generator 100 is not inputted to the control circuit 300.

Next, the circuit configuration of the DC/DC converter 202 will be described.

As shown in FIG. 5, the DC/DC converter 202 includes circuits A1 and A2 between: the input voltage terminals VaH and VaL; and the output voltage terminals VbH and VbL. The circuit A1 includes: a series unit including two MOSFETs (MOS-1L and MOS-1H) connected in series to each other, which are a low-voltage-side switching device and a high-voltage-side switching device, respectively; and a smoothing capacitor Cs1 connected in parallel to the series unit. The circuit A2 includes: a series unit including two MOSFETs (MOS-2L and MOS-2H) connected in series to each other, which are a low-voltage-side switching device and a high-voltage-side switching device, respectively; and a smoothing capacitor Cs2 connected in parallel to the series unit. Moreover, the circuits A1 and A2 are connected in series to form two stages. In addition, as will be described later, of the circuits A1 and A2, the first circuit A1 is caused to function as a rectification circuit, and the second circuit A2 is caused to function as a driving inverter circuit.

A connection point between the MOSFETs (MOS-1L and MOS-1H) in the circuit A1, and a connection point between the MOSFETs (MOS-2L and MOS-2H) in the circuit A2 are set as intermediate terminals. An LC series unit LC12 including a capacitor Cr and an inductor Lr for transferring energy which are connected in series to each other is connected to the intermediate terminals of the first and second circuits A1 and A2. It is noted that each MOSFET is a power MOSFET having a parasitic diode formed between the source and the drain. It is noted that each MOSFET may be formed by a switch made of other materials such as silicon carbide or gallium nitride, instead of silicon.

A specific connection state is as follows. A low-voltage-side terminal of the smoothing capacitor Cs1 is connected to the output voltage terminal VbL and the input voltage terminal VaL. A high-voltage-side terminal of the smoothing capacitor Cs1 is connected to the output voltage terminal VbH and a low-voltage-side terminal of the smoothing capacitor Cs2. A high-voltage-side terminal of the smoothing capacitor Cs2 is connected to the input voltage terminal VaH. The source terminal of the MOS-1L is connected to the input voltage terminal VaL and the output voltage terminal VbL. The drain terminal of the MOS-1H and the source terminal of the MOS-2L are connected to the high-voltage-side terminal of the smoothing capacitor Cs1. The drain terminal of the MOS-2H is connected to the high-voltage-side terminal of the smoothing capacitor Cs2. One end of the LC series unit LC12 is connected to the connection point between the MOS-1L and the MOS-1H, and the other end is connected to the connection point between the MOS-2L and the MOS-2H.

Moreover, the control circuit 300 supplies the four gate driving signals Gate-1L to Gate-2H to the gate terminals of the MOSFETs (MOS-1L to MOS-2H), respectively. In this case, the gate driving signals Gate-1L to Gate-2H are voltage signals whose reference voltages are the source terminal voltages of the respective MOSFETs. In addition, gate drivings by the Gate-1L and Gate-2L are performed at the same timing, and gate drivings by the Gate-1H and Gate-2H are performed at the same timing.

Next, operation of the DC/DC converter 202 will be described.

The DC/DC converter 202 steps down the voltage V1 inputted through the input voltage terminals VaH and VaL into the voltage V2 (14 V), which is about ½ as large as the voltage V1, and outputs the voltage V2 through the output voltage terminals VbH and VbL.

In the above step-down operation, the circuits A1 and A2 are driven by the gate driving signals Gate-1L to Gate-2H from the control circuit 300. Then, as described above, the second circuit A2 operates as a driving inverter circuit, and the first circuit A1 operates as a rectification circuit for rectifying a current driven by the driving inverter circuit, and transferring energy to the low-voltage side.

Figure 6:
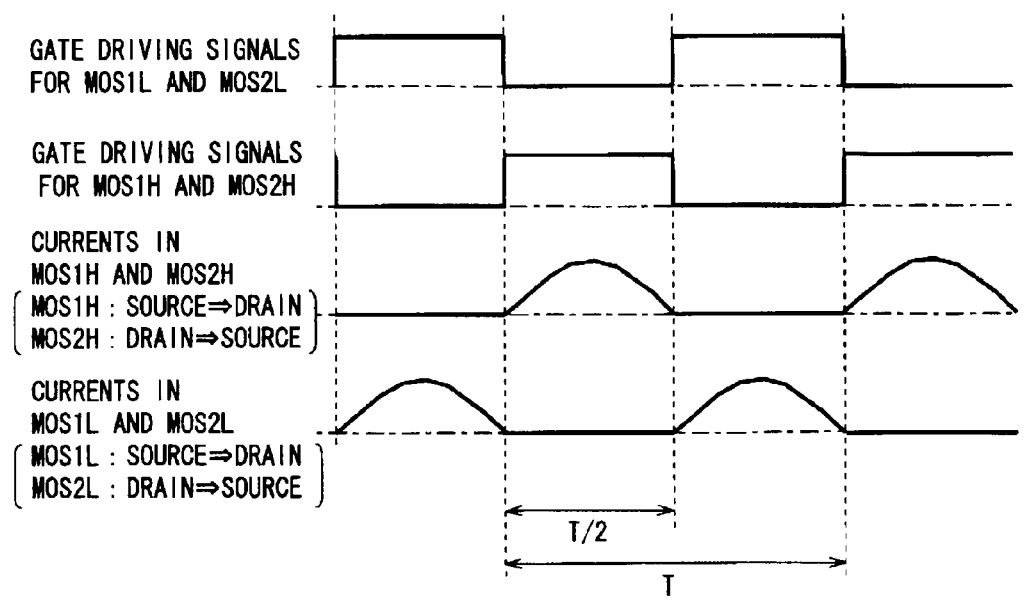
FIG. 6 is a timing chart showing waveforms of currents flowing in MOSFETs included in the DC/DC converter of the power supply apparatus of embodiment 2, and waveforms of gate driving signals for the MOSFETs.

FIG. 6 is a timing chart showing a relationship of the gate driving signals for the high-voltage-side MOSFETs and the low-voltage-side MOSFETs, to currents flowing in the high-voltage-side MOSFETs (MOS-2H and MOS-1H) of the driving inverter circuit A2 and the rectification circuit A1 and in the low-voltage-side MOSFETs (MOS-2L and MOS-1L) of the driving inverter circuit A2 and the rectification circuit A1.

A current flows from the drain to the source of each of the MOSFETs (MOS-2H and MOS-2L) in the driving inverter circuit A2, and a current flows from the source to the drain of each of the MOSFETs (MOS-1H and MOS-1L) in the rectification circuit A1. Each of the MOSFETs is turned ON when the gate driving signal has a high voltage. In this case, if a resonance period of the LC series unit LC including the inductor Lr and the capacitor Cr is represented by T, the gate driving signal is an ON/OFF signal whose duty ratio is about 50%.

Here, if both the MOS-2H and MOS-1H, which are the high-voltage-side MOSFETs of the circuits A2 and A1, are respectively turned ON by the gate driving signals Gate-2H and Gate-1H for the high-voltage-side MOSFETs, a part of the energy stored in the smoothing capacitor Cs2 is transferred to the capacitor Cr because of voltage difference in accordance with the following path.

Cs2→MOS-2H→Cr→Lr→MOS-1H

Next, if both the MOS-2L and MOS-1L, which are the low-voltage-side MOSFETs of the circuits A2 and A1, are respectively turned ON by the gate driving signals Gate-2L and Gate-1L for the low-voltage-side MOSFETs, the energy stored in the capacitor Cr is transferred to the smoothing capacitor Cs1 because of voltage difference in accordance with the following path.

Cr→MOS-2L→Cs1→MOS-1L→Lr

Thus, energy is transferred from the smoothing capacitor Cs2 to the smoothing capacitor Cs1 by charge and discharge of the capacitor Cr. Then, the DC/DC converter 202 steps down the voltage V1 inputted through the input voltage terminals VaH and VaL into the voltage V2 (14 V), which is about ½ as large as the voltage V1, and outputs the voltage V2 through the output voltage terminals VbH and VbL. It is noted that since the power of the inputted voltage V1 is transferred as the power of the voltage V2 into which the voltage V1 is stepped down, the voltage V1 is slightly larger than 28 V which is two times as large as the output voltage V2 (14 V).

In the above operation, since the inductor Lr is connected in series to the capacitor Cr to form the LC series unit LC, the above transfer of energy is performed by using a resonance phenomenon, and a transitional loss is not caused when the states of the switching devices are changed (ON↔OFF). Therefore, a large amount of energy can be efficiently transferred. In addition, in embodiment 2, since MOSFETs are used as switching devices of the circuit A1 which operates as a rectification circuit, a conduction loss can be reduced and the efficiency of power conversion can be improved, in comparison with the case of using diodes as the switching devices.

As described above, in embodiment 2, the power loss of the DC/DC converter is smaller than that in embodiment 1, and thus is excellent with respect to the efficiency of power conversion. Therefore, the size of a heat radiator for cooling a circuit can be reduced. In addition, since a transitional loss is not caused when the switching devices are switched, the switching frequencies can be set at high values. As a result, the resonance frequency of the LC series unit can be increased, and both the inductance and the capacitance of the inductor Lr and the capacitor Cr for transferring energy can be set at small values. Accordingly, the sizes of these circuit devices are also small. Therefore, in embodiment 2, the whole size of the DC/DC converter can be significantly reduced.

It is noted that although in the DC/DC converter of embodiment 2, the circuit A1 which operates as a rectification circuit is formed by MOSFETs, the circuit A1 can achieve the same operation even if the circuit A1 is formed by diodes. In a diode, although the power loss slightly increases and efficiency is slightly deteriorated because a voltage drop caused upon conduction of a diode is large, there is a merit that a circuit device for driving the gate terminal of a MOSFET is not needed.

In addition, although in the DC/DC converter of embodiment 2, the LC series unit including the inductor Lr and the capacitor Cr is used as a device for transferring energy, the capacitor Cr alone can achieve the same operation. However, in this case, the amount of a transferred energy decreases, and the effective value of a current flowing in the circuit increases. Therefore, the power loss increases, and efficiency of power conversion is slightly deteriorated.

Next, the whole operation of the power supply apparatus including the AC generator 100, the DC/DC converter 202, and the control circuit 300 of embodiment 2, will be described.

Figure 7:
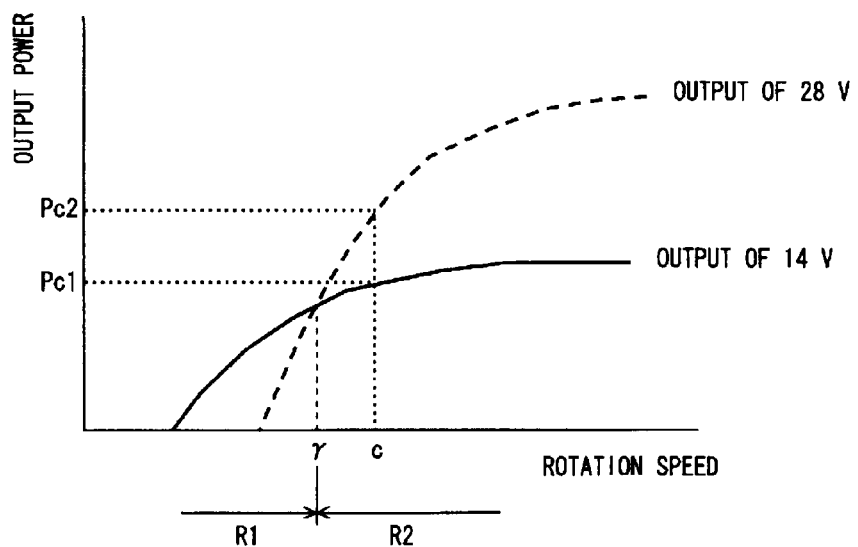
FIG. 7 is a characteristic diagram showing a relationship of the rotation speed and the output power of an AC generator of the power supply apparatus of embodiment 2, to the output voltage of the AC generator.

FIG. 7 shows a relationship between the rotation speed and the output power in the cases where the output voltage of the AC generator 100 is 14 V and 28 V as an example. As shown in FIG. 7, γ represents the rotation speed at the intersection of an output characteristic line (solid line) for 14 V and an output characteristic line (dashed line) for 28 V. As is found from FIG. 7, in a region R1 in which the rotation speed of the AC generator is equal to or smaller than γ, a large power can be outputted by setting the output voltage at 14 V. Meanwhile, in a region R2 in which the rotation speed is equal to or larger than γ, a large power can be outputted by setting the output voltage at 28 V.

Here, for example, when the rotation speed of the AC generator 100 is c (γ<c) in FIG. 7, the superior controller, not shown, determines a required amount of power supply (amount of electrical generation), and outputs an instruction of a voltage setting value corresponding to the required amount of power supply, to the control circuit 300. In the case where the voltage instruction indicates 14 V, that is, in the case where the amount of electrical generation does not need to be increased, the control circuit 300 causes the MOSFETs (MOS-2H and MOS-2L) of the second circuit A2 in the DC/DC converter 202 to be constantly ON, causes the MOSFETs (MOS-1H, or MOS-1H and MOS-1L) of the first circuit A1 in the DC/DC converter 202 to be constantly OFF, and shorts the output of the AC generator 100 and the output of the DC/DC converter 202. Then, in this state, as described in embodiment 1, the control circuit 300 causes the field adjusting circuit 130 of the AC generator 100 to adjust a current in the field winding KCL, and thereby adjusts the output voltage (V2) of the DC/DC converter 202 at 14 V. In this operation state, since a high-frequency current does not flow in the DC/DC converter 202, the energy can be transferred with a low power loss.

On the other hand, in the case where a voltage instruction given to the control circuit 300 by the superior controller, not shown, indicates 28 V, that is, in the case where the amount of electrical generation needs to be increased, the control circuit 300 performs ON/OFF control for the MOSFETs in the DC/DC converter 202 in accordance with the LC resonance period T as described above, and keeps a relationship between the output voltage V2 of the DC/DC converter 202 and the output voltage V1 of the AC generator 100 so as to satisfy V1=2×V2. Next, the control circuit 300 causes the field adjusting circuit 130 of the AC generator 100 to adjust a current in the field winding KCL, and thereby adjusts the output voltage (V2) of the DC/DC converter 202 at 14 V. At this time, the output voltage of the AC generator 100 is a value slightly larger than 28 V which is two times as large as 14 V.

It is noted that also in the case where the rotation speed of the AC generator 100 is equal to or smaller than γ, the control circuit 300 causes the MOSFETs (MOS-2H and MOS-2L) of the second circuit A2 in the DC/DC converter 202 to be constantly ON, causes the MOSFETs (MOS-1H, or MOS-1H and MOS-1L) of the first circuit A1 in the DC/DC converter 202 to be constantly OFF, and shorts the output of the AC generator 100 and the output of the DC/DC converter 202.

Also the power supply apparatus of embodiment 2 can further increase the output voltage in comparison with the conventional power supply apparatus having only the AC generator 100. At this time, since a high-frequency current flows in the DC/DC converter 202, the power loss increases in comparison with that upon the above operation based on a voltage instruction indicating 14 V. However, the power loss is smaller than that in embodiment 1 because efficiency of power conversion of the DC/DC converter 202 is high.

In addition, in embodiment 2, the DC/DC converter 202 only selects one of the shorting operation and the ON/OFF control, and the AC generator 100 only controls constantly the output voltage V2 of the DC/DC converter 202 at a predetermined value of 14 V. Thus, voltage control of the power supply apparatus is simplified in comparison with that of embodiment 1. Moreover, owing to the simplification of the method of the control, the control circuit 300 is simplified, and downsizing and cost reduction of the control circuit 300 can be achieved.

For example, in automobiles, the rotation speed of the engine is usually 1000 rpm to 3000 rpm in normal use. Also in this case, by adjusting the ratio of gears connecting the rotor of the AC generator 100 and the rotation section of the engine so as to obtain the characteristic shown in FIG. 7, a desired output power can be obtained.

Embodiment 3

Figure 8:
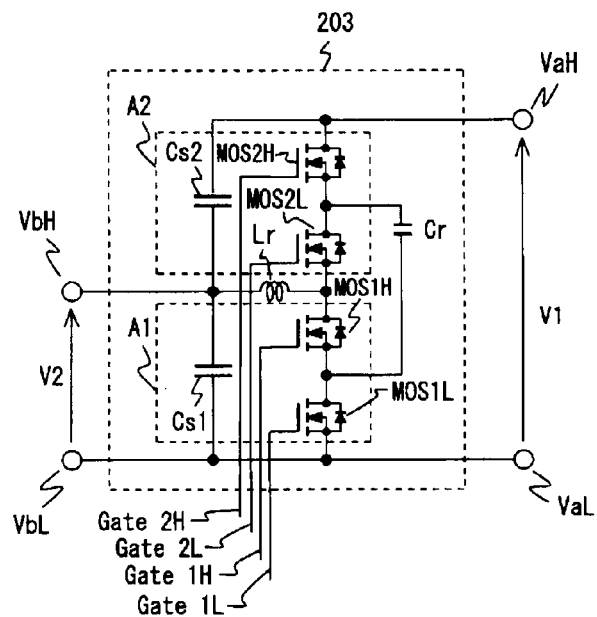
FIG. 8 is a circuit diagram showing a configuration of a DC/DC converter of a power supply apparatus of embodiment 3 of the present invention.

FIG. 8 is a circuit diagram showing a configuration of a DC/DC converter of a power supply apparatus of embodiment 3 of the present invention. Components that correspond to or are the same as components in embodiment 2 shown in FIG. 5 are denoted by the same reference numerals.

The power supply apparatus of embodiment 3 is different from that of embodiment 2 only in a configuration of a DC/DC converter 203. That is, the inductor Lr in the DC/DC converter 203 for transferring energy is provided between connection points between the circuits A1 and A2. That is, the inductor Lr is provided between: the connection point between the drain terminal of the MOSFET (MOS-1H) of the circuit A1 and the source terminal of the MOS-2L of the circuit A2; and the connection point between the smoothing capacitors Cs1 and Cs2. Since the configuration other than the connection position of the inductor Lr is the same as that (FIG. 5) in embodiment 2, the detailed description thereof is omitted herein.

Next, operation of the DC/DC converter 203 will be described.

The four gate driving signals Gate-1L to Gate-2H given to the respective MOSFETs of the circuits A1 and A2 are the same as those in embodiment 2.

Here, if the MOS-2H and MOS-1H, which are the high-voltage-side MOSFETs of the circuits A2 and A1, are respectively turned ON by the gate driving signals Gate-2H and Gate-1H for the high-voltage-side MOSFETs, a part of the energy stored in the smoothing capacitor Cs2 is transferred to the capacitor Cr because of voltage difference in accordance with the following path.

Cs2→MOS-2H→Cr→MOS-1H→Lr

Next, if the MOS-2L and MOS-1L, which are the low-voltage-side MOSFETs of the circuits A2 and A1, are respectively turned ON by the gate driving signals Gate-2L and Gate-1L for the low-voltage-side MOSFETs, the energy stored in the capacitor Cr is transferred to the smoothing capacitor Cs1 because of voltage difference in accordance with the following path.

Cr→MOS-2L→Lr→Cs1→MOS-1L

Thus, energy is transferred from the smoothing capacitor Cs2 to the smoothing capacitor Cs1 by charge and discharge of the capacitor Cr. Then, the DC/DC converter 203 steps down the voltage V1 inputted through the input voltage terminals VaH and VaL into the voltage V2 (14 V), which is about ½ as large as the voltage V1, and outputs the voltage V2 through the output voltage terminals VbH and VbL.

The operation of the DC/DC converter 203 of the power supply apparatus of embodiment 3 is basically the same as that in embodiment 2. Therefore, the power loss is smaller than that in embodiment 1, and in addition, as in embodiment 2, there is a merit that the method of the control is simple and that downsizing and cost reduction of the control circuit 300 can be achieved.

It is noted that since the whole operation, and other functions and effects of the power supply apparatus including the DC/DC converter 203 are the same as those in embodiment 2, the detailed description thereof is omitted herein.

Embodiment 4

Figure 9:
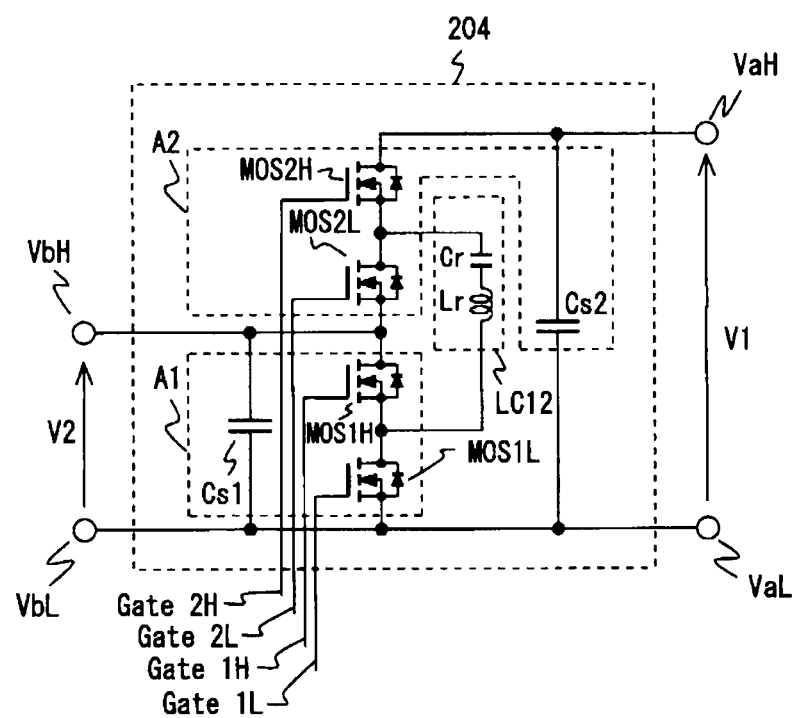
FIG. 9 is a circuit diagram showing a configuration of a DC/DC converter of the power supply apparatus of embodiment 4 of the present invention.

FIG. 9 is a circuit diagram showing a configuration of a DC/DC converter of a power supply apparatus of embodiment 4 of the present invention. Components that correspond to or are the same as components in embodiment 2 shown in FIG. 5 are denoted by the same reference numerals.

The power supply apparatus of embodiment 4 is different from the power supply apparatus of each of embodiments 2 and 3 only in a configuration of a DC/DC converter 204. That is, in embodiment 4, the smoothing capacitor Cs2 of the circuit A2 included in the DC/DC converter 204 is provided between the input-output voltage terminal VaH and VaL. Since the configuration other than the connection position of the smoothing capacitor Cs2 is the same as that (FIG. 5) in embodiment 2, the detailed description thereof is omitted herein.

Next, operation of the DC/DC converter 204 will be described.

The four gate driving signals Gate-1L to Gate-2H for the respective MOSFETs of the circuits A1 and A2 are the same as those in embodiment 2.

Here, if both the MOS-2H and MOS-1H, which are the high-voltage-side MOSFETs, are respectively turned ON by the gate driving signals Gate-2H and Gate-1H for the high-voltage-side MOSFETs, a part of the energy stored in the smoothing capacitor Cs2 is transferred to the capacitor Cr because of voltage difference in accordance with the following path.

Cs2→MOS-2H→Cr→Lr→MOS-1H→Cs1

Next, if both the MOS-2L and MOS-1L, which are the low-voltage-side MOSFETs, are respectively turned ON by the gate driving signals Gate-2L and Gate-1L for the low-voltage-side MOSFETs, the energy stored in the capacitor Cr is transferred to the smoothing capacitor Cs1 because of voltage difference in accordance with the following path.

Cr→MOS-2L→Cs1→MOS-1L→Lr

Thus, energy is transferred from the smoothing capacitor Cs2 to the smoothing capacitor Cs1 by charge and discharge of the capacitor Cr. Then, the DC/DC converter 204 steps down the voltage V1 inputted through the input voltage terminals VaH and VaL into the voltage V2 (14 V), which is about ½ as large as the voltage V1, and outputs the voltage V2 through the output voltage terminals VbH and VbL.

As described above, the operation of the DC/DC converter 204 of the power supply apparatus of embodiment 4 is basically the same as that in embodiment 2. Therefore, the power loss is smaller than that in embodiment 1, and in addition, as in embodiments 2 and 3, there is a merit that the method of the control is simple and that downsizing and cost reduction of the control circuit 300 can be achieved.

It is noted that since the whole operation, and other functions and effects of the power supply apparatus including the DC/DC converter 204 are the same as those in embodiment 2, the detailed description thereof is omitted herein.

Embodiment 5

Figure 10:
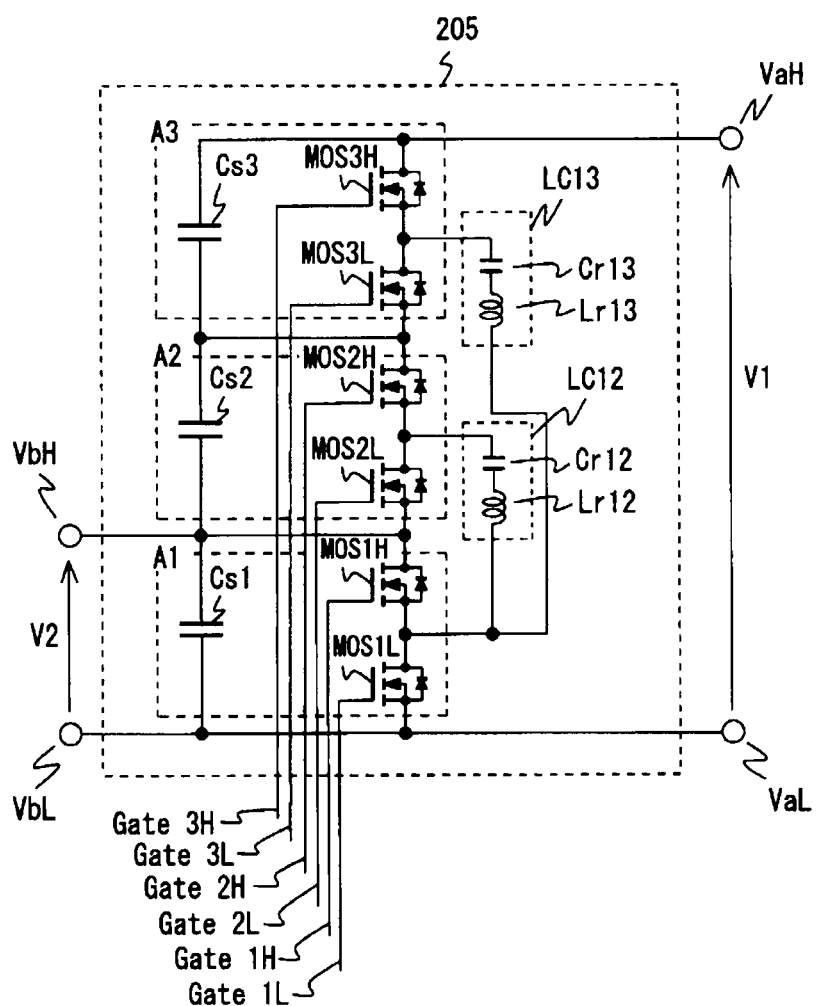
FIG. 10 is a circuit diagram showing a configuration of a DC/DC converter of a power supply apparatus of embodiment 5 of the present invention.

FIG. 10 is a circuit diagram showing a configuration of a DC/DC converter of a power supply apparatus of embodiment 5 of the present invention. Components that correspond to or are the same as components in embodiment 2 shown in FIG. 5 are denoted by the same reference numerals.

The DC/DC converter 205 of the power supply apparatus of embodiment 5 includes, in addition to the components in embodiment 2, a circuit A3 adjacent to the circuit A2, on the opposite side of the circuit A2 as from the circuit A1. Similarly to the circuits A1 and A2, the circuit A3 includes: a series unit including two MOSFETs (MOS-3L and MOS-3H) connected in series to each other, which are a low-voltage-side switching device and a high-voltage-side switching device, respectively; and a smoothing capacitor Cs3 connected in parallel to the series unit. Moreover, the circuits A1, A2, and A3 are connected in series to form three stages. Of the circuits A1, A2, and A3, the first circuit A1 is caused to function as a rectification circuit, and the second circuit A2 and the third circuit A3 are caused to function as driving inverter circuits.

A connection point between the MOSFETs (MOS-1L and MOS-1H) in the circuit A1, a connection point between the MOSFETs (MOS-2L and MOS-2H) in the circuit A2, and a connection point between the MOSFETs (MOS-3L and MOS-3H) in the circuit A3, are set as intermediate terminals. An LC series unit LC12 including a capacitor Cr12 and an inductor Lr12 for transferring energy which are connected in series to each other is connected to the intermediate terminals of the first and second circuits A1 and A2, and an LC series unit LC13 including a capacitor Cr13 and an inductor Lr13 for transferring energy which are connected in series to each other is connected to the intermediate terminals of the first and third circuits A1 and A3. The resonance periods of the LC series units LC12 and LC13 in this case are set to be the same. It is noted that each MOSFET is a power MOSFET having a parasitic diode formed between the source and the drain.

The control circuit 300 supplies six gate driving signals Gate-1L to Gate-3H to the gate terminals of the MOSFETs (MOS-1L to MOS-3H), respectively. The gate driving signals Gate-1L to Gate-3H are voltage signals whose reference voltages are the source terminal voltages of the respective MOSFETs. Gate drivings by the Gate-1L, Gate-2L, and Gate 3L are performed at the same timing, and gate drivings by the Gate-1H, Gate-2H, and Gate 3H are performed at the same timing.

Next, operation of the DC/DC converter 205 will be described.

The DC/DC converter 205 steps down the voltage V1 inputted through the input voltage terminals VaH and VaL into the voltage V2 (14 V), which is about ⅓ as large as the voltage V1, and outputs the voltage V2 through the output voltage terminals VbH and VbL.

The above step-down operation of the DC/DC converter 205 is performed by driving the circuits A1, A2, and A3 by the gate driving signals Gate-1L to Gate-3H from the control circuit 300. In this case, as described above, the circuits A2 and A3 operate as driving inverter circuits, and the first circuit A1 operates as a rectification circuit for rectifying a current driven by the driving inverter circuits, and transferring the energy to the low-voltage side.

First, if all of the MOS-3H, MOS-2H, and MOS-1H, which are the high-voltage-side MOSFETs, are respectively turned ON by the gate driving signals Gate-3H, Gate-2H, and Gate-1H for the high-voltage-side MOSFETs, a part of the energy stored in the smoothing capacitor Cs2, and a part of the energy stored in the smoothing capacitor Cs3 are respectively transferred to the capacitors Cr12 and Cr13 because of voltage difference in accordance with the following paths.

Cs2→Cs3→MOS-3H→Cr13→Lr13→MOS-1H
Cs2→MOS-2H→Cr12→Lr12→MOS-1H

Next, if all of the MOS-3L, MOS-2L, and MOS-1L, which are the low-voltage-side MOSFETs are respectively turned ON by the gate driving signals Gate-3L, Gate-2L, and Gate-1L for the low-voltage-side MOSFETs, the energy stored in the capacitor Cr12 and the energy stored in the capacitor Cr13 are respectively transferred to the smoothing capacitors Cs1 and Cs2 because of voltage difference in accordance with the following paths.

Cr13→MOS-3L→Cs2→Cs1→MOS-1L→Lr13
Cr12→MOS-2L→Cs1→MOS-1L→Lr12

Thus, energies are respectively transferred from the smoothing capacitors Cs2 and Cs3 to the smoothing capacitors Cs1 and Cs2 by charge and discharge of the capacitors Cr12 and Cr13. Then, the DC/DC converter 205 steps down the voltage V1 inputted through the input voltage terminals VaH and VaL thereof into the voltage V2 (14 V), which is about ⅓ as large as the voltage V1, and outputs the voltage V2 through the output voltage terminals VbH and VbL. It is noted that since the power of the inputted voltage V1 is transferred as the power of the voltage V2 into which the voltage V1 is stepped down, the voltage V1 is slightly larger than 42 V which is three times as large as the output voltage V2 (14 V).

As in embodiments 2 to 4, also the operation of the DC/DC converter 205 of the power supply apparatus of embodiment 5 has a merit that the power loss is smaller than that in embodiment 1. In addition, as in embodiments 2 to 4, there is a merit that the method of the control is simple and that downsizing and cost reduction of the control circuit 300 can be achieved. Moreover, in embodiment 5, since the voltage ratio of the output of the AC generator 100 and the output of the DC/DC converter 205 is 1:3, there is a merit that the output power can be further increased.

It is noted that since other functions and effects of the DC/DC converter 205 of embodiment 5 are the same as those of embodiments 2 to 4, the detailed description thereof is omitted herein.

Next, the whole operation of the power supply apparatus including the AC generator 100, the DC/DC converter 205, and the control circuit 300 will be described.

Figure 11:
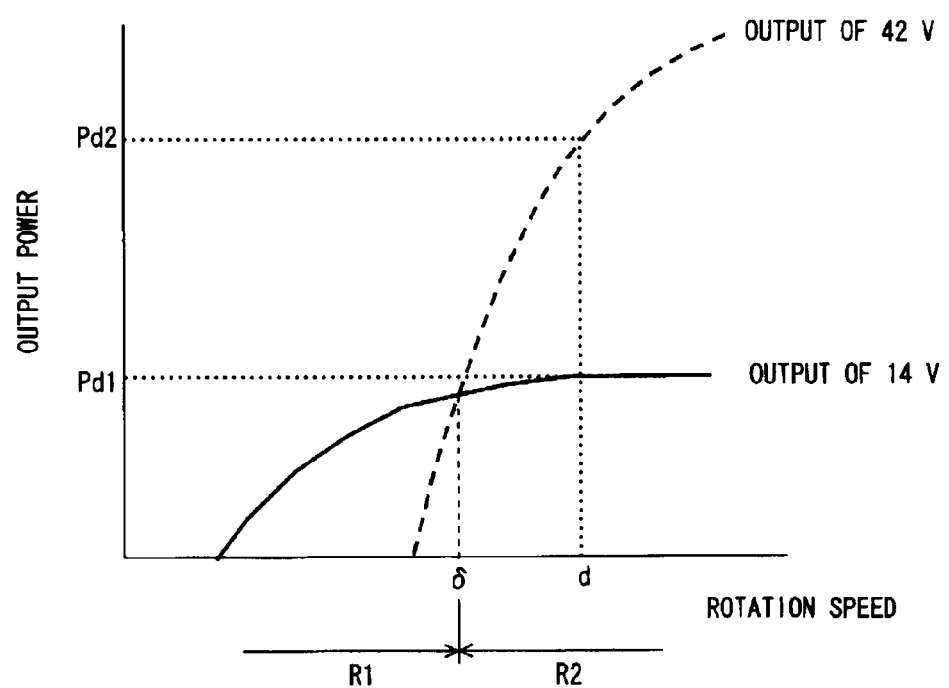
FIG. 11 is a diagram showing a relationship of the rotation speed and the output power of an AC generator of the power supply apparatus of embodiment 5, to the output voltage of the AC generator.

FIG. 11 shows a relationship between the rotation speed and the output power in the cases where the output voltage of the AC generator 100 is 14 V and 42 V as an example. As shown in FIG. 11, δ represents the rotation speed at the intersection of an output characteristic line (solid line) for 14 V and an output characteristic line (dashed line) for 42 V. In a region R1 in which the rotation speed of the AC generator is equal to or smaller than δ, a large power can be outputted by setting the output voltage at 14V. In a region R2 in which the rotation speed of the AC generator is equal to or larger than δ, a large power can be outputted by setting the output voltage at 42 V.

Next, operation performed when the rotation speed of the AC generator 100 is d (δ<d) in FIG. 11 will be described.

The superior controller, not shown, determines a required amount of power supply (amount of electrical generation), and outputs an instruction of a voltage setting value corresponding to the required amount of power supply, to the control circuit 300. In the case where the voltage instruction indicates 14 V, that is, in the case where the amount of electrical generation does not need to be increased, the control circuit 300 causes the MOS-3H, MOS-3L, MOS-2H, and MOS-2L in the DC/DC converter 205 to be constantly ON, causes the MOS-1H and MOS-1L in the DC/DC converter 205 to be constantly OFF (or causes only the MOS-1H to be constantly OFF), and shorts the output of the AC generator 100 and the output of the DC/DC converter 205. Subsequently, as previously described, the control circuit 300 causes the field adjusting circuit 130 of the AC generator 100 to adjust a current in the field winding KCL, and thereby adjusts the output voltage (V2) of the DC/DC converter 205 at 14 V. In this operation state, since a high-frequency current does not flow in the DC/DC converter 205, the energy can be transferred with a low power loss.

On the other hand, in the case where a voltage instruction for the control circuit 300 indicates 42 V, that is, in the case where the amount of electrical generation needs to be increased, the control circuit 300 performs ON/OFF control for the MOS-1L to MOS-3H in the DC/DC converter 205 in accordance with the LC resonance period T as previously described, and keeps a relationship between the output voltage V2 of the DC/DC converter 205 and the output voltage V1 of the AC generator 100 so as to satisfy V1=3×V2. Next, the control circuit 300 causes the field adjusting circuit 130 of the AC generator 100 to adjust a current in the field winding KCL, and thereby adjusts the output voltage (V2) of the DC/DC converter 205 at 14 V. At this time, the output voltage of the AC generator 100 is a value slightly larger than 42 V which is three times as large as 14 V.

It is noted that in embodiment 5, even if the smoothing capacitor Cs3 is removed from the circuit A3 and the smoothing capacitor Cs3 is provided between the input voltage terminals VaH and VaL as in embodiment 4, the power supply apparatus operates in the same manner.

In addition, since other functions and effects of the power supply apparatus of embodiment 5 are the same as those of embodiments 2 to 4, the detailed description thereof is omitted herein.

Embodiment 6

Figure 12:
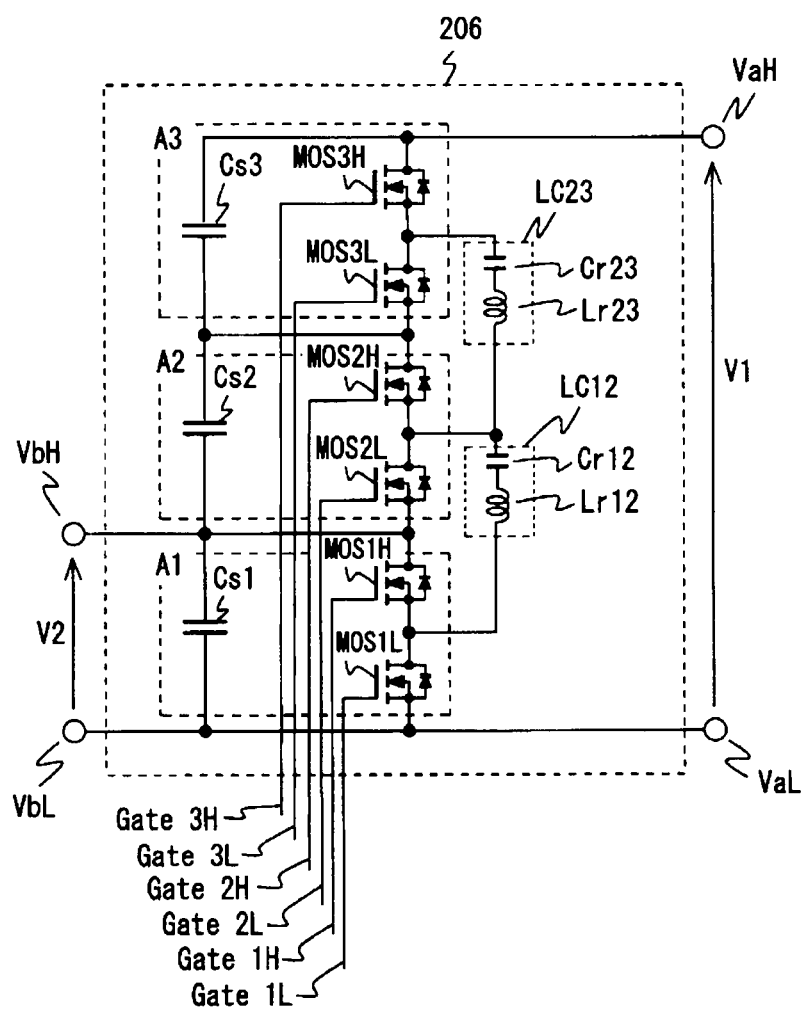
FIG. 12 is a circuit diagram showing a configuration of a DC/DC converter of a power supply apparatus of embodiment 6 of the present invention.

FIG. 12 is a circuit diagram showing a configuration of a DC/DC converter of a power supply apparatus of embodiment 6 of the present invention. Components that correspond to or are the same as components in embodiment 5 shown in FIG. 10 are denoted by the same reference numerals.

The power supply apparatus of embodiment 6 is different from that of embodiment 5 only in a configuration of a DC/DC converter 206. In the DC/DC converter 206, a connection point between the MOSFETs (MOS-1L and MOS-1H) in the circuit A1, a connection point between the MOSFETs (MOS-2L and MOS-2H) in the circuit A2, and a connection point between the MOSFETs (MOS-3L and MOS-3H) in the circuit A3, are set as intermediate terminals. The LC series unit LC12 including the capacitor Cr12 and the inductor Lr12 for transferring energy which are connected in series to each other is connected to the intermediate terminals of the first and second circuits A1 and A2, and an LC series unit LC23 including a capacitor Cr23 and an inductor Lr23 for transferring energy which are connected in series to each other is connected to the intermediate terminals of the second and third circuits A2 and A3. It is noted that the resonance periods of the LC series units LC12 and LC13 are the same.

Next, operation of the DC/DC converter 206 will be described.

Similarly to embodiment 5, the circuits A1, A2, and A3 are driven by the six gate driving signals Gate-1L to Gate-3H given by the control circuit 300. In this case, the second and third circuits A2 and A3 operate as driving inverter circuits, and the first circuit A1 operates as a rectification circuit for rectifying a current driven by the driving inverter circuits, and transferring energy to the low-voltage side, which is also similar to embodiment 5.

First, if all of the MOS-3H, MOS-2H, and MOS-1H, which are the high-voltage-side MOSFETs, are respectively turned ON by the gate driving signals Gate-3H, Gate-2H, and Gate-1H for the high-voltage-side MOSFETs, a part of the energy stored in the smoothing capacitor Cs2, and a part of the energy stored in the smoothing capacitor Cs3 are respectively transferred to the capacitors Cr12 and Cr23 because of voltage difference in accordance with the following paths.

Cs2→Cs3→MOS-3H→Cr23→Lr23→Cr12→Lr12→MOS-1H

Cs2→MOS-2H→Cr12→Lr12→MOS-1H

Next, if all of the MOS-3L, MOS-2L, and MOS-1L, which are the low-voltage-side MOSFETs are respectively turned ON by the gate driving signals Gate-3L, Gate-2L, and Gate-1L for the low-voltage-side MOSFETs, the energy stored in the capacitor Cr12 and the energy stored in the capacitor Cr23 are respectively transferred to the smoothing capacitors Cs1 and Cs2 because of voltage difference in accordance with the following paths.

Cr12→Lr23→Cr23→MOS-3L→Cs2→Cs1→MOS-1L→Lr12

Cr12→MOS-2L→Cs1→MOS-1L→Lr12

Thus, energies are respectively transferred from the smoothing capacitors Cs2 and Cs3 to the smoothing capacitors Cs1 and Cs2 by charge and discharge of the capacitors Cr12 and Cr23. Then, the DC/DC converter 206 steps down the voltage V1 inputted through the input voltage terminals VaH and VaL into the voltage V2 (14 V), which is about ⅓ as large as the voltage V1, and outputs the voltage V2 through the output voltage terminals VbH and VbL.

It is noted that in embodiment 6, even if the smoothing capacitor Cs3 is removed from the circuit A3 and the smoothing capacitor Cs3 is provided between the input voltage terminals VaH and VaL as in embodiment 4, the power supply apparatus operates in the same manner.

In addition, the whole operation of the power supply apparatus including the DC/DC converter 206 of embodiment 6 is the same as that of embodiment 5, and other functions and effects of the power supply apparatus are the same as those of embodiment 5. Therefore, the detailed description thereof is omitted herein.

Embodiment 7

Figure 13:
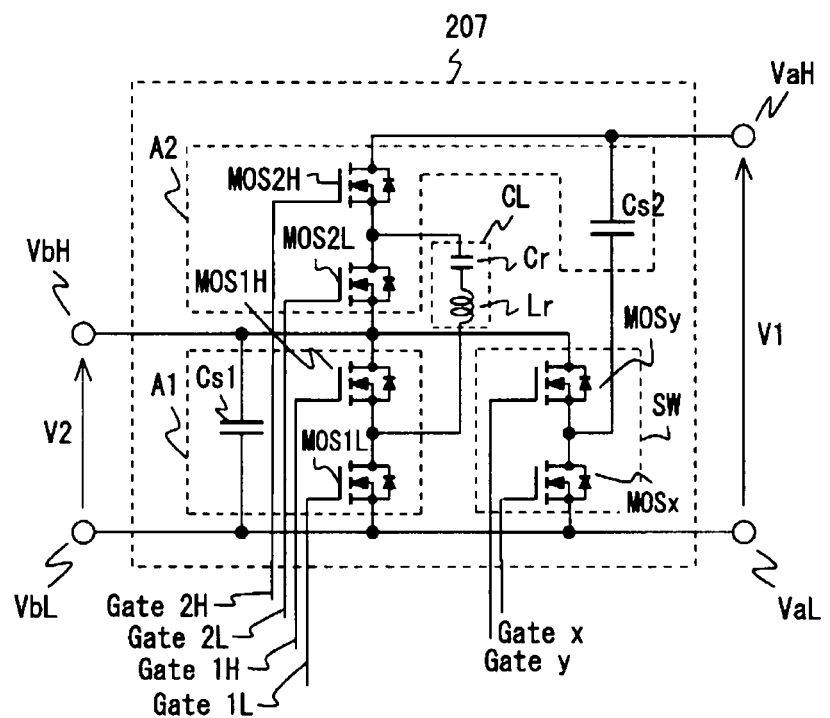
FIG. 13 is a circuit diagram showing a configuration of a DC/DC converter of a power supply apparatus of embodiment 7 of the present invention.

FIG. 13 is a circuit diagram showing a configuration of a DC/DC converter of a power supply apparatus of embodiment 7 of the present invention. Components that correspond to or are the same as components in embodiment 2 shown in FIG. 5 are denoted by the same reference numerals.

In each of embodiments 2 to 4 described above, in the case where the amount of electrical generation of the AC generator 100 does not need to be increased and the output voltage of the AC generator 100 is changed from 28 V to 14 V, the control circuit 300 causes the MOS-2H and MOS-2L of the circuit A2 to be constantly ON, causes the MOS-1H and MOS-1L of the circuit A1 to be constantly OFF (or causes the MOS-1H to be constantly OFF), and shorts the output of the AC generator 100 and the output of each of the DC/DC converters 202 to 204. At this time, when the MOS-2H and the MOS-2L are turned ON, in embodiments 2 and 3, the voltage applied between both ends of the capacitor Cs2 changes from 14 V to 0 V, and in embodiment 4, the voltage applied between both ends of the capacitor Cs2 changes from 28 V to 14 V. Therefore, a large current flows in the circuit of the DC/DC converter for a moment. There is a possibility that the large current having a pulse shape causes the circuit devices in the DC/DC converter to generate an excessive amount of heat and thereby the circuit devices are deteriorated. As a measure against this, in embodiment 7, a switching circuit SW including two MOSFETs (MOS-x and MOS-y) is provided, thereby preventing the large current having a pulse shape from flowing in the circuit of the DC/DC converter.

FIG. 13 shows a circuit configuration of a DC/DC converter 207 of embodiment 7 in which the above-described improvement is made to the configuration (FIG. 5) in embodiment 2, as an example.

The DC/DC converter 207 (FIG. 13) of embodiment 7 is different from the DC/DC converter (FIG. 5) of embodiment 2 in that the DC/DC converter 207 includes the switching circuit SW including the two MOSFETs (MOS-x and MOS-y), gate driving signals Gate-x and Gate-y for driving the two MOSFETs are outputted from the control circuit 300, and the gate driving signals Gate-x and Gate-y are inputted to the respective gate terminals of the MOSFETs (MOS-x and MOS-y).

As shown in FIG. 13, the source terminal of the MOS-x is connected to the low-voltage-side input voltage terminal VaL and the low-voltage-side output voltage terminal VbL, and the drain terminal of the MOS-x is connected to the source terminal of the MOS-y and the low-voltage-side terminal of the smoothing capacitor Cs2. The drain terminal of the MOS-y is connected to the high-voltage-side output voltage terminal VbH. The low-voltage-side terminal of the smoothing capacitor Cs2 is connected to the connection point between the MOS-x and MOS-y, and the high-voltage-side terminal of the smoothing capacitor Cs2 is connected to the input voltage terminal VaH.

When the DC/DC converter 207 performs a power conversion operation of stepping down the voltage V1 (28 V) between the input voltage terminals VaH and VaL into the voltage V2 (14 V) between the output voltage terminals VbH and VbL, the MOS-y is turned ON and the MOS-x is turned OFF. The state of connection at this time is the same as that in embodiment 2. Therefore, the operation of DC/DC converter 207 is the same as that in embodiment 2.

In addition, when an operation of shorting the output of the AC generator 100 and the output of the DC/DC converter 207 is to be performed, the MOS-2H and the MOS-2L are caused to be constantly ON, and the MOS-1H and the MOS-1L are caused to be constantly OFF (or the MOS-1H is caused to be constantly OFF). In this case, in the switching circuit SW, the MOS-y is turned OFF and the MOS-x is turned ON. Thus, the smoothing capacitor Cs2 is connected in parallel to the smoothing capacitor Cs1. Therefore, when the output voltage of the AC generator 100 changes from 28 V to 14 V, a voltage of 14 V is stored in each of the smoothing capacitors Cs1 and Cs2. Therefore, upon the change from 28 V to 14 V, a large current from the smoothing capacitor Cs2 to the smoothing capacitor Cs1 does not occur.

The DC/DC converter 207 of embodiment 7 can perform the same step-down operation as those of embodiments 2 to 6, except the operation of the added switching circuit SW. Therefore, the power loss of the DC/DC converter 207 is smaller than that in embodiment 1, and in addition, as in embodiments 2 to 6, there is a merit that the method of the control is simplified and that downsizing and cost reduction of the control circuit 300 can be achieved.

It is noted that since the whole operation of the power supply apparatus including the DC/DC converter 207 is the same as that in embodiment 2, except the operation described above. In addition, other configurations, functions, and effects of the power supply apparatus are also the same as those in embodiment 2. Therefore, the detailed description thereof is omitted herein.

Embodiment 8

Figure 14:
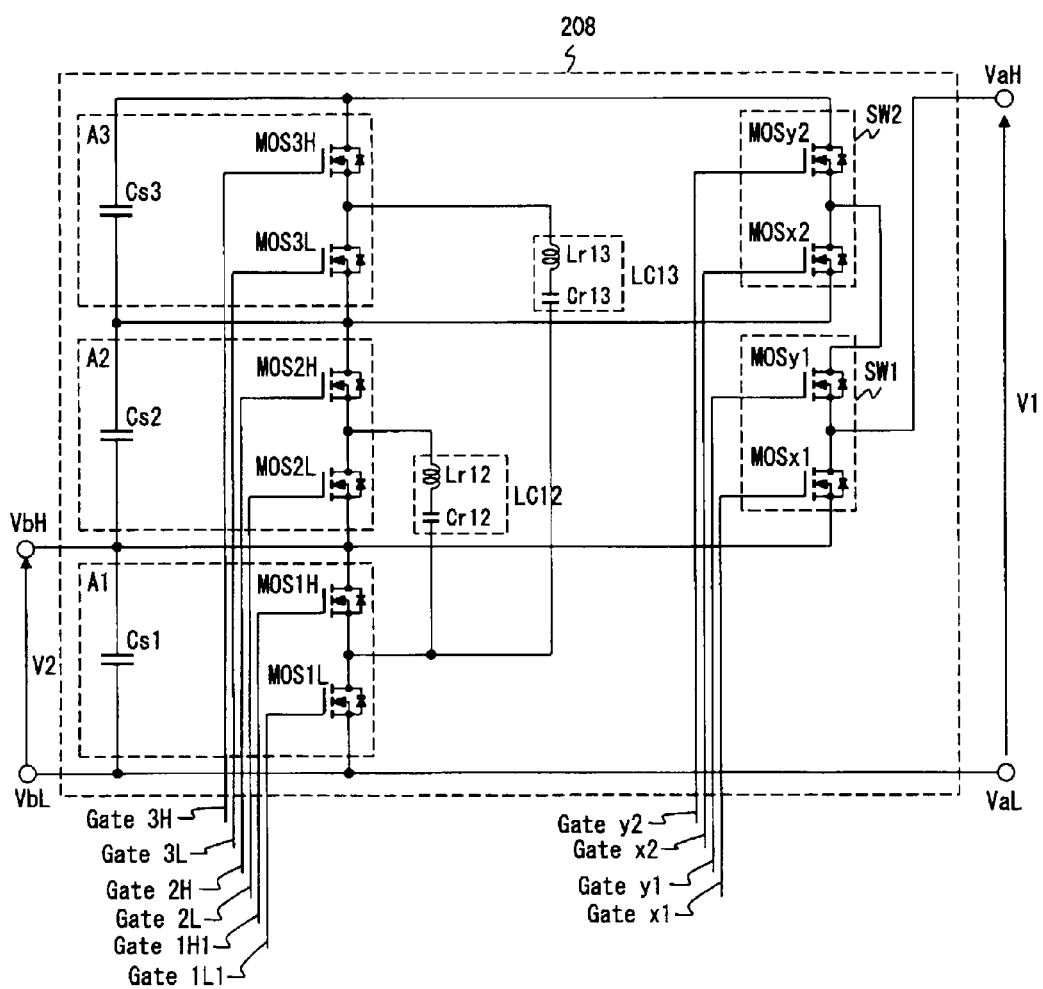
FIG. 14 is a circuit diagram showing a configuration of a DC/DC converter of a power supply apparatus of embodiment 8 of the present invention.

FIG. 14 is a circuit diagram showing a configuration of a DC/DC converter of a power supply apparatus of embodiment 8 of the present invention. Components that correspond to or are the same as components in embodiment 5 shown in FIG. 10 are denoted by the same reference numerals.

The power supply apparatus of embodiment 8 is different from that of embodiment 5 in a configuration of a DC/DC converter 208. In each of embodiments 5 and 6, the output voltage V1 of the AC generator 100 can be set at 14 V or 42 V. However, in embodiment 8, the output voltage V1 of the AC generator 100 can be set at 14 V, 28 V, or 42 V. Therefore, a current in the AC generator 100 can be more finely controlled, and heat generation can be suppressed.

The DC/DC converter 208 of embodiment 8 shown in FIG. 14 is different from the DC/DC converter of embodiment 5 shown in FIG. 10 in that the DC/DC converter 208 includes a switching circuit SW1 including two MOSFETs (MOS-x1 and MOS-y1) and a switching circuit SW2 including two MOSFETs (MOS-x2 and MOS-y2), gate driving signals Gate-x1, Gate-y1, Gate-x2, and Gate-y2 for driving the MOSFETs are outputted from the control circuit 300, and the gate driving signals Gate-x1, Gate-y1, Gate-x2, and Gate-y2 are inputted to the respective gate terminals of the MOSFETs (MOS-x1, MOS-y1, MOS-x2, and MOS-y2). It is noted that in embodiment 8, since MOSFETs are used as switching devices of the MOS-y1 and the MOS-y2, a conduction loss can be reduced and the efficiency of power conversion can be improved, in comparison with the case of using diodes as the switching devices.

In the DC/DC converter 208 in FIG. 14, the source terminal of the MOS-x1 is connected to the output voltage terminal VbH, and the drain terminal of MOS-x1 is connected to the source terminal of the MOS-y1, and the input voltage terminal VaH. The drain terminal of the MOS-y1 is connected to the drain terminal of the MOS-x2 and the source terminal of the MOS-y2. The source terminal of the MOS-x2 is connected to the drain terminal of the MOS-2H and the source terminal of the MOS-3L. The drain terminal of the MOS-y2 is connected to the high-voltage-side terminal of the smoothing capacitor Cs3, and the drain terminal of the MOS-3H.

Next, operation of the DC/DC converter 208 will be described.

Similarly to embodiment 5, the circuits A1, A2, and A3 are driven by the six gate driving signals Gate-1L to Gate-3H given by the control circuit 300. In this case, the second and third circuits A2 and A3 operate as driving inverter circuits, and the first circuit A1 operates as a rectification circuit for rectifying a current driven by the driving inverter circuits, and transferring the energy to the low-voltage side.

When a power conversion operation of stepping down the voltage V1 (42 V) between the input voltage terminals VaH and VaL into the voltage V2 (14 V) between the output voltage terminals VbH and VbL is to be performed, the MOS-x1 is turned OFF, the MOS-y1 is turned ON, the MOS-x2 is turned OFF, and the MOS-y2 is turned ON. The state of circuit connection in this case is the same as that in embodiment 5. Therefore, the operation of DC/DC converter 208 is the same as that in embodiment 5.

When a power conversion operation of stepping down the voltage V1 (28 V) between the input voltage terminals VaH and VaL into the voltage V2 (14 V) between the output voltage terminals VbH and VbL is to be performed, the MOS-x1 is turned OFF, the MOS-y1 is turned ON, the MOS-x2 is turned ON, and the MOS-y2 is turned OFF. The state of connection in this case is the same as that in embodiment 2. Therefore, the operation of DC/DC converter 208 is the same as that in embodiment 2.

When the voltage V1 (14 V) of the input voltage terminals VaH and VaL, and the voltage V2 (14 V) of the output voltage terminals VbH and VbL are to be shorted, the MOS-x1 is turned ON, the MOS-y1 is turned OFF, the MOS-x2 is turned OFF, and the MOS-y2 is turned OFF.

As described above, in embodiment 8, since the output voltage V1 of the AC generator 100 can be set at 14 V, 28 V, or 42 V, a current in the AC generator 100 can be finely controlled, and heat generation can be suppressed. In addition, the DC/DC converter 208 of embodiment 8 can perform the same step-down operation as those of embodiments 2 and 5, except the operation of the added switching circuits SW1 and SW2. Therefore, a loss in the DC/DC converter 208 is smaller than that in embodiment 1, and in addition, as in embodiments 2 and 5, there is a merit that the method of the control is simplified and that downsizing and cost reduction of the control circuit 300 can be achieved.

It is noted that since the whole operation of the power supply apparatus including the DC/DC converter 208 is the same as those in embodiments 2 and 5, except the operation described above. In addition, other configurations, functions, and effects of the power supply apparatus are also the same as those in embodiments 2 and 5. Therefore, the detailed description thereof is omitted herein.

Embodiment 9

The power supply apparatus of embodiment 9 is different from that of embodiment 1 in configurations of their AC generators. In embodiment 1, the three-phase AC generating section 110 which adjusts the output voltage of the AC generator 100 by using the field adjusting circuit 130 is described. In the present embodiment, an application of the present invention to an AC generator including a three-phase AC generating section that does not have a function of adjusting the output voltage of the AC generator, which three-phase AC generating section is of a permanent magnet type, for example, will be described.

Figure 15:
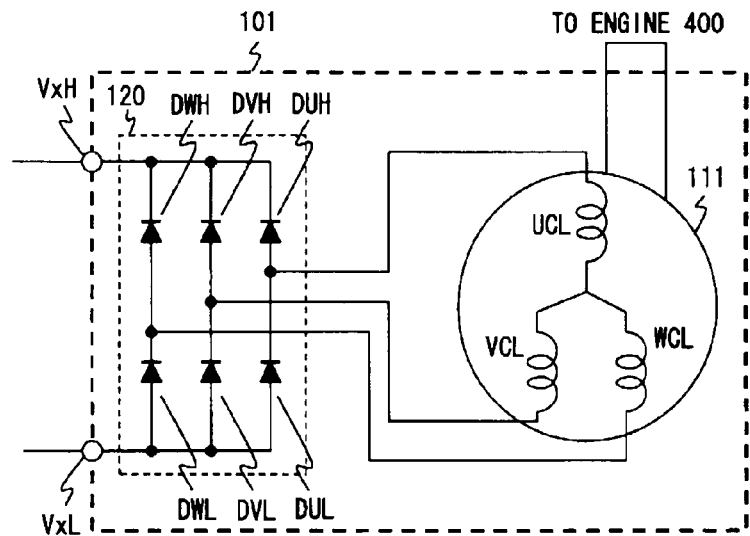
FIG. 15 is a circuit diagram showing a configuration of an AC generator of a power supply apparatus of embodiment 9 of the present invention.

FIG. 15 is a circuit diagram showing a configuration of an AC generator 101 of the power supply apparatus of embodiment 9 of the present invention. The AC generator 101 of the present embodiment includes a permanent-magnet-type three-phase AC generating section 111, and the rectifier 120 which is the same as that of embodiment 1. The three-phase AC generating section 111 includes the stator windings UCL, VCL, and WCL, and a rotor having a magnet embedded in its rotor core made of a magnetic metal such as iron.

Also in the power supply apparatus including the three-phase AC generating section 111 as described above, similarly to embodiment 1, in the case where a required output power of the AC generator 101 is small, the input voltage terminal VaH and the output voltage terminal VbH of the DC/DC converter 201 are shorted by using the switch in the DC/DC converter 201, and energy is supplied to a electric load, a battery, or the like. In addition, in the case where the output power of the AC generator 101 is desired to be increased, the DC/DC converter 201 is controlled such that the output voltage V1 of the AC generator 101 is larger than the output voltage V2 of the DC/DC converter 201. That is, the control circuit 300 detects the voltage V2 of the output voltage terminal VbH. Then, the control circuit 300 compares the detected voltage V2 with an intended voltage (for example, 14 V), and thereby determines a duty ratio of the gate driving signal Gate-0 to be inputted to the gate terminal of the MOSFET (MOS-0). If the detected voltage V2 is smaller than the intended voltage, the control circuit 300 adjusts the gate driving signal Gate-0 such that the duty ratio increases, and if the detected voltage V2 is larger than the intended voltage, the control circuit 300 adjusts the gate driving signal Gate-0 such that the duty ratio decreases.

It is noted that since the whole operation, and other functions and effects of the power supply apparatus including the AC generator 101 of the present embodiment are the same as those in embodiment 1, the detailed description thereof is omitted herein.

Embodiment 10

A power supply apparatus of embodiment 10 of the present invention is different from that of each of embodiments 2 to 8 in configurations of their AC generators. The AC generator 102 of the present embodiment includes the permanent-magnet-type three-phase AC generating section 111 which is the same as that of embodiment 9, a shorting circuit 140 for adjusting the output power by performing shorting control for the output terminals of the three-phase AC generating section 111, and the rectifier 120 which is the same as that of embodiment 2. In embodiment 2, the output voltage of the AC generator 100 is adjusted by the field adjusting circuit 130. In the present embodiment, the output voltage of the AC generator 102 is adjusted by the shorting circuit 140.

Figure 16:
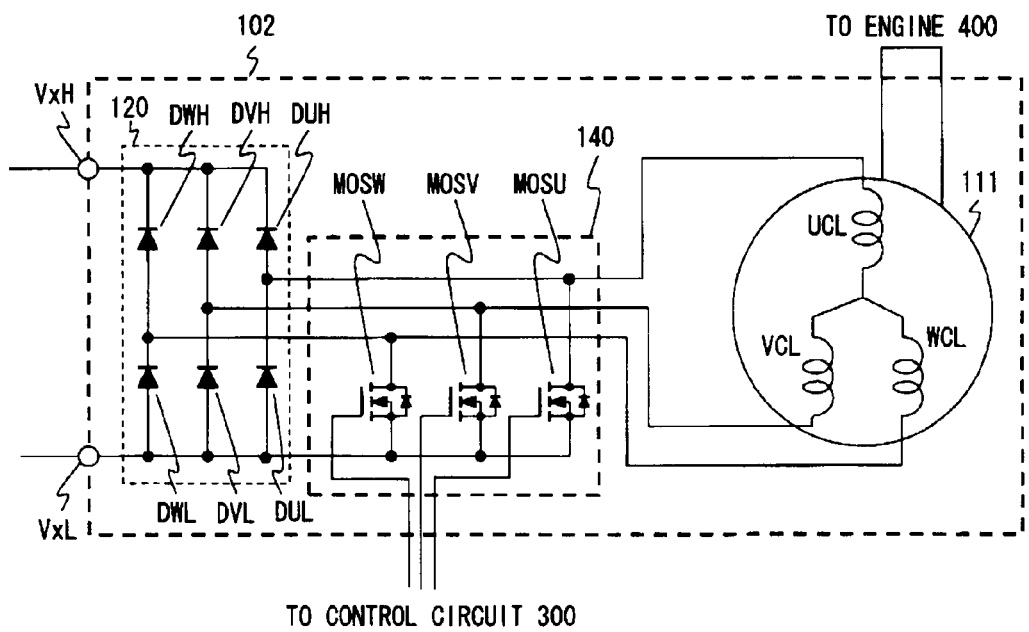
FIG. 16 is a circuit diagram showing a configuration of an AC generator of a power supply apparatus of embodiment 10 of the present invention.

FIG. 16 is a circuit diagram showing a configuration of the AC generator 102 of the power supply apparatus of embodiment 10 of the present invention.

As shown in FIG. 16, the shorting circuit 140 includes switching devices such as MOSFETs, thyristors, or IGBTs. Here, circuit connection in the case where MOSFETs are used as the switching devices will be described in detail. The shorting circuit 140 includes MOSFETs (MOS-U, MOS-V, and MOS-W). The drain of the MOS-U is connected to the cathode of the diode DUL included in the rectifier 120, and the source of the MOS-U is connected to the output voltage terminal VxL. The drain of the MOS-V is connected to the cathode of the diode DVL included in the rectifier 120, and the source of the MOS-V is connected to the output voltage terminal VxL. The drain of the MOS-W is connected to the cathode of the diode DWL included in the rectifier 120, and the source of the MOS-W is connected to the output voltage terminal VxL. Gate driving signals from the control circuit 300 are respectively inputted to the gates of the MOS-U, the MOS-V, and the MOS-W.

Moreover, the control circuit 300 detects the output voltage of the rectifier 120 or the DC/DC converter, and outputs the gate driving signals to the MOS-U, the MOS-V, and the MOS-W. At this time, the control circuit 300 shorts or doesn't short the output terminals of the three-phase AC generating section 111 by performing switching control of the MOS-U, the MOS-V, and the MOS-W, to control the output voltage of the three-phase AC generating section 111 at a predetermined value, thereby obtaining a desired amount of power supply.

In the configuration of DC/DC converter of each of embodiments 2 to 8, since the input-output voltage ratio is fixed at 1/n (n is a natural number), continuous adjustment of the output power cannot be performed. It is noted that in embodiment 1, the output power can be adjusted by the AC generator or the DC/DC converter. In each of embodiments 2 to 8, the output power can be adjusted by the AC generator. In embodiment 9, the output power can be adjusted by the DC/DC converter. In embodiment 10 of the present invention, the output terminals of the three-phase AC generating section 111 are shorted or aren't shorted by using the shorting circuit 140, whereby the output power is adjusted.

It is noted that since the whole operation, and other functions and effects of the power supply apparatus including the AC generator 102 are the same as those in embodiments 2 to 8, the detailed description thereof is omitted herein.

Embodiment 11

Figure 17:
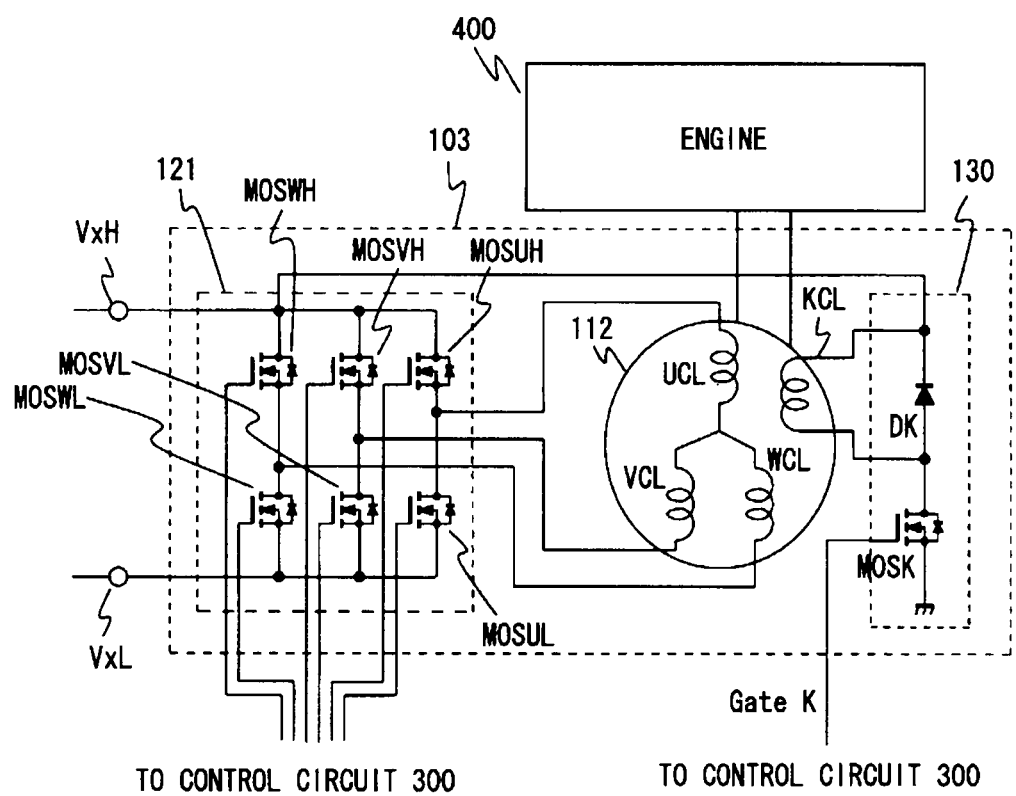
FIG. 17 is a circuit diagram showing a configuration of an AC generator of a power supply apparatus of embodiment 11 of the present invention.

In embodiments 1 to 10, power supply apparatuses using AC generators such as alternators or using permanent-magnet-type AC generators are described. In the present embodiment, as shown in FIG. 17, a system including: a motor generator 112 that has not only a function of electrical generation but also a function of power running, which motor generator 112 is used for, for example, idle reduction; and an inverter 121 including semiconductors such as MOSFETs (MOS-UH to MOS-WL), will be described. The system may be used in combination with the DC/DC converter described in each of the above embodiments to perform the operation described above, and thereby the output upon electrical generation may be increased.

In addition, although in embodiments 1 to 11, power supply apparatuses for vehicles are described as examples, the present invention is applicable to power supply apparatuses for purposes other than vehicles as long as the power supply apparatuses are systems including generators.

Industrial Applicability

A power supply apparatus of the present invention is broadly applicable to not only a power supply apparatus for a vehicle but also a system including a generator.

The invention claimed is:

1. A power supply apparatus comprising:
an AC generator including
an AC generating section, and
a rectifier for rectifying an AC voltage generated in the AC generating section into a DC voltage, and outputting the DC voltage; and
a DC/DC converter for converting the DC voltage outputted by the rectifier into a DC voltage having a voltage value different from that of the DC voltage outputted by the rectifier, and outputting the DC voltage that has been converted,
wherein the DC/DC converter performs a step-down operation for stepping down the output voltage of the AC generator and performs a shorting operation for shorting the output of the AC generator and the output of the DC/DC converter,
wherein, the step-down operation and the shorting operation of the DC/DC converter are switched in accordance with the rotation speed of the AC generating section and the amount of power supply to an electrical load connected to the DC/DC converter.

2. The power supply apparatus according to claim 1, wherein
the power supply apparatus detects the DC voltage outputted by the rectifier or the DC voltage outputted by DC/DC converter, adjusts an exciting current in a field winding of the AC generating section, and sets the DC voltage outputted by the rectifier at a predetermined value, thereby controlling the amount of power supply.

3. The power supply apparatus according to claim 2, wherein
the AC generator includes a motor generator as the AC generating section which has a function of power running,
the AC generator includes an inverter in place of the rectifier, and
the inverter rectifies an AC voltage generated in the motor generator into a DC voltage, and outputs the DC voltage.

4. The power supply apparatus according to claim 1, further comprising a shorting circuit for controlling the amount of power supply, wherein
the power supply apparatus detects the DC voltage outputted by the rectifier or the DC voltage outputted by DC/DC converter, and
the shorting circuits shorts or opens output terminals of the AC generating section by switching operation to set the DC voltage outputted by the rectifier at a predetermined value on an average, thereby controlling the amount of power supply.

5. The power supply apparatus according to claim 1, wherein
the DC/DC converter includes one or more switching devices for performing ON/OFF control for connection between: input voltage terminals of the DC/DC converter that are connected to the output side of the rectifier; and output voltage terminals of the DC/DC converter that are connected to the electrical load,
when the amount of power supply is larger than a predetermined value, the DC/DC converter performs an operation of stepping down the DC voltage outputted by the rectifier by the ON/OFF control of the one or more switching devices, and outputs the DC voltage that has been stepped down, and
when the amount of power supply is smaller than the predetermined value, the DC/DC converter stops the operation of stepping down performed by the ON/OFF control of the one or more switching devices, and outputs the DC voltage outputted by the rectifier.

6. The power supply apparatus according to claim 5, wherein the DC/DC converter includes an inductor, the storage amount or the discharge amount of the magnetic energy of the inductor being controlled in accordance with time intervals based on the ON/OFF control of the one or more switching devices.

7. The power supply apparatus according to claim 5, wherein the DC/DC converter includes one or more capacitors for energy transfer which transfer energy by charge and discharge based on the ON/OFF control of the one or more switching devices.

8. The power supply apparatus according to claim 7, wherein
the DC/DC converter includes, between: the input voltage terminals; and the output voltage terminals, a plurality of circuits each of which includes: as the one or more switching devices, a series unit having a high-voltage-side switching device and a low-voltage-side switching device connected in series to each other; and a smoothing capacitor connected in parallel to the series unit,
at least one of the plurality of circuits is used as a rectification circuit, the other of the plurality of circuits are used as driving inverter circuits, and the plurality of circuits are connected in series to each other, and
a connection point between the high-voltage-side switching device and the low-voltage-side switching device in each of the plurality of circuits is set as an intermediate terminal, and the one or more capacitors for energy transfer are provided between the intermediate terminals of the plurality of circuits.

9. The power supply apparatus according to claim 8, wherein
in the DC/DC converter, the smoothing capacitor included in the driving inverter circuit connected to a high-voltage-side one of the input voltage terminals is removed, and a smoothing capacitor is connected to the input voltage terminals.

10. The power supply apparatus according to claim 8, wherein
    each of the one or more capacitors for energy transfer is connected to the intermediate terminal of the rectification circuit, and the corresponding one of the intermediate terminals of the driving inverter circuits.

11. The power supply apparatus according to claim 8, wherein
    each of the one or more capacitors for energy transfer is connected to the intermediate terminals of the corresponding circuits of the plurality of circuits that are adjacent to each other.

12. The power supply apparatus according to claim 8, wherein
    the DC/DC converter includes the one rectification circuit, the one driving inverter circuit, and a switching circuit including a series unit having a high-voltage-side switching device and a low-voltage-side switching device connected in series to each other, and
    a low-voltage-side terminal of the smoothing capacitor included in the one driving inverter circuit is connected to a connection point between the high-voltage-side switching device and the low-voltage-side switching device in the switching circuit.

13. The power supply apparatus according to claim 12, wherein
    the DC/DC converter turns ON the high-voltage-side switching device of the switching circuit and turns OFF the low-voltage-side switching device of the switching circuit, when the DC/DC converter steps down the DC voltage outputted by the rectifier and outputs the DC voltage that has been stepped down, and
    the DC/DC converter turns ON the low-voltage-side switching device of the switching circuit and turns OFF the high-voltage-side switching device of the switching circuit, when the DC/DC converter directly outputs the DC voltage outputted by the rectifier without stepping down the DC voltage.

14. The power supply apparatus according to claim 8, wherein
    the DC/DC converter includes one or more inductors on respective paths through which the one or more capacitors for energy transfer charge or discharge.

15. The power supply apparatus according to claim 14, wherein
    resonance periods determined by the capacitances of the respective capacitors for energy transfer and the inductances of the respective inductors are set to be equal to each other.

16. The power supply apparatus according to claim 8, wherein
    the DC/DC converter includes switching circuits for controlling connection or disconnection between each of high-voltage-side terminals of the plurality of circuits of the DC/DC converter, and the high-voltage-side one of the input voltage terminals.

17. The power supply apparatus according to claim 5, wherein
    the switching device is a power MOSFET having a parasitic diode formed between a source and a drain thereof, or is inverse-parallel diodes.

* * * * *